(12) United States Patent
Shigeta

(10) Patent No.: US 7,123,755 B2
(45) Date of Patent: Oct. 17, 2006

(54) IMAGE INPUT APPARATUS, SUBJECT IDENTIFICATION SYSTEM, SUBJECT VERIFICATION SYSTEM AND IMAGE INPUT METHOD

(75) Inventor: Kazuyuki Shigeta, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 722 days.

(21) Appl. No.: 10/308,395

(22) Filed: Dec. 3, 2002

(65) Prior Publication Data

US 2003/0147550 A1 Aug. 7, 2003

(30) Foreign Application Priority Data

Dec. 4, 2001 (JP) .............................. 2001-370170
Mar. 28, 2002 (JP) .............................. 2002-091692

(51) Int. Cl.
G06K 9/00 (2006.01)
G03B 3/00 (2006.01)
G03B 15/02 (2006.01)

(52) U.S. Cl. ............................. 382/124; 396/98; 362/3
(58) Field of Classification Search ................. 382/124
See application file for complete search history.

(56) References Cited

U.S. PATENT DOCUMENTS

| | | | | |
|---|---|---|---|---|
| 4,934,810 A | | 6/1990 | Nagele et al. | |
| 4,998,132 A | * | 3/1991 | Kurogane et al. | ............. 355/40 |
| 5,163,102 A | * | 11/1992 | Yamazaki et al. | .......... 382/274 |
| 5,456,256 A | * | 10/1995 | Schneider et al. | .......... 600/445 |
| 6,011,860 A | * | 1/2000 | Fujieda et al. | .............. 382/126 |
| 6,151,419 A | * | 11/2000 | Aoki | .......................... 382/274 |
| 6,637,656 B1 | * | 10/2003 | Kurogama et al. | .... 235/462.25 |

FOREIGN PATENT DOCUMENTS

| | | |
|---|---|---|
| JP | 7-273949 | 10/1995 |
| JP | 9-113957 | 5/1997 |
| WO | 01/54051 A2 | 7/2001 |

OTHER PUBLICATIONS

English Extract (partial) translation of WO 01/54051 (publication copy of WO 01/54051 previously filed Jun. 16, 2005).
European Patent Office; "European Search Report"; of corresponding European Patent Application No. EP 02 02 7081; date of mailing Mar. 17, 2005; (3 pages).

* cited by examiner

Primary Examiner—Joseph Mancuso
Assistant Examiner—Kathleen Yuan
(74) Attorney, Agent, or Firm—Morgan & Finnegan LLP

(57) ABSTRACT

The present invention provides high-accuracy image input capable of correcting for uneven lighting due to the shape of the subject, its reflectivity, its positioning and ambient light conditions, without increasing the scale of the circuitry or its costs. The image input apparatus of the present invention has an LED that projects light onto the subject, a sensor including a plurality of pixels arranged two-dimensionally and that detects light reflected back from the subject, and a controller that changes the LED irradiation conditions in a cycle longer than that for a single screen.

2 Claims, 18 Drawing Sheets

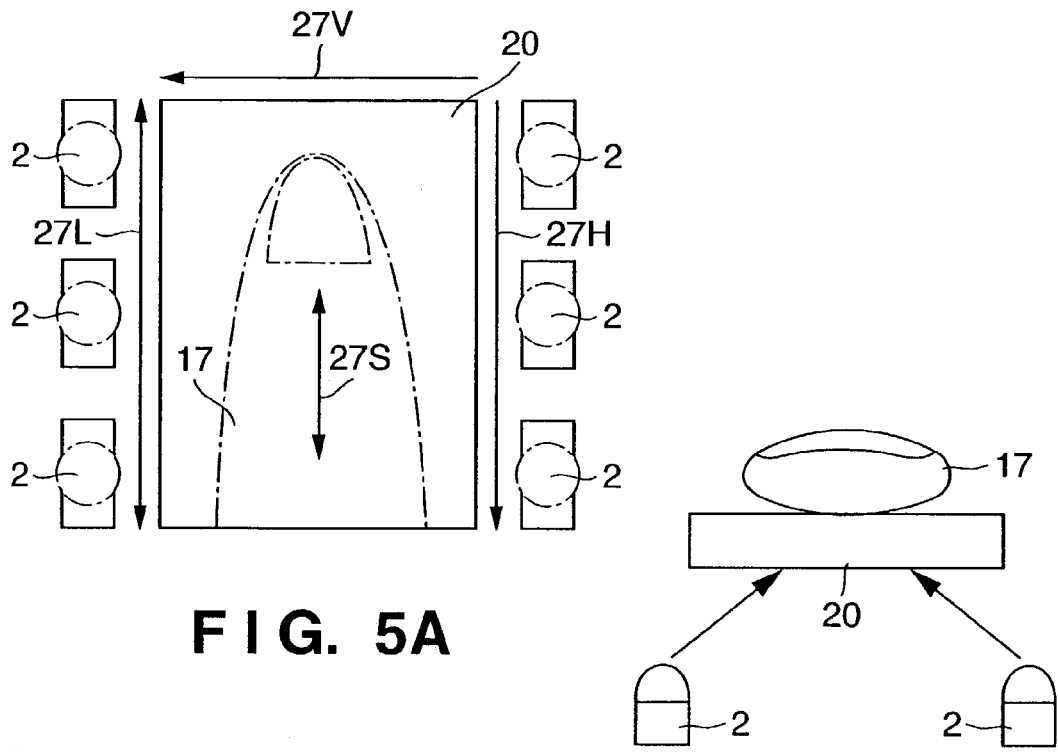
F I G. 5A
F I G. 5B
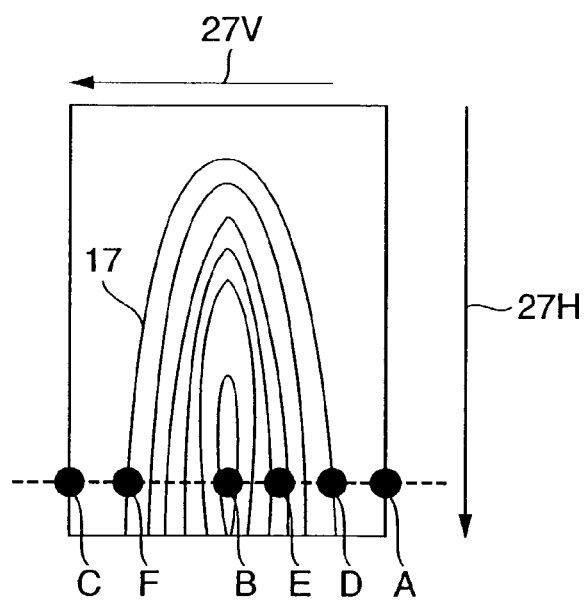
F I G. 5C

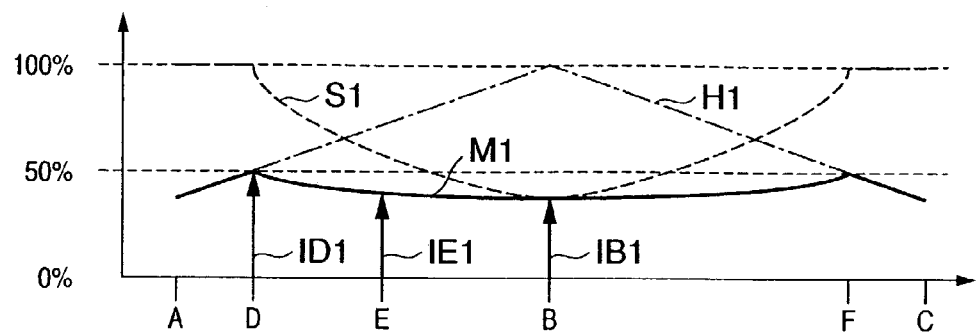
F I G. 10A
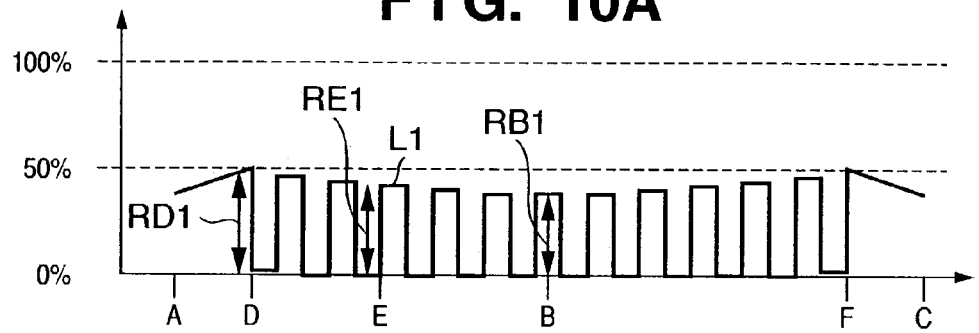
F I G. 10B
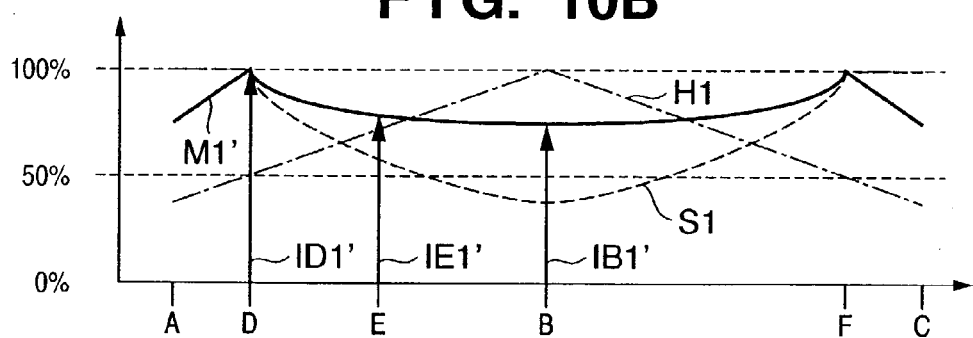
F I G. 10C
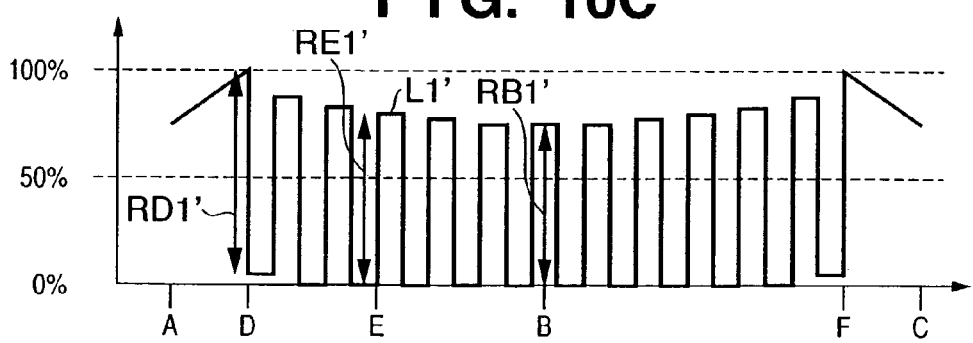
F I G. 10D

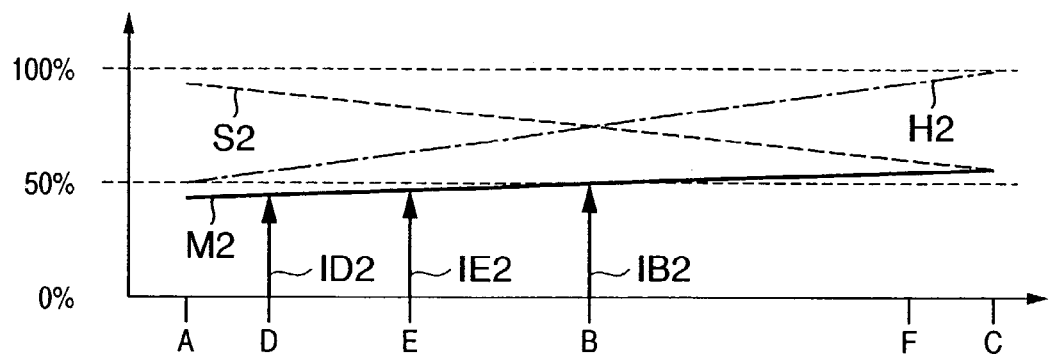
F I G. 14A
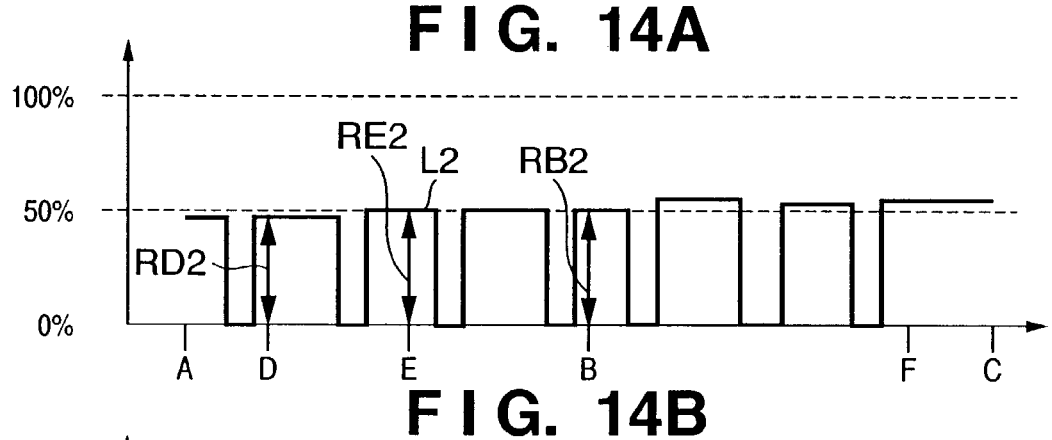
F I G. 14B
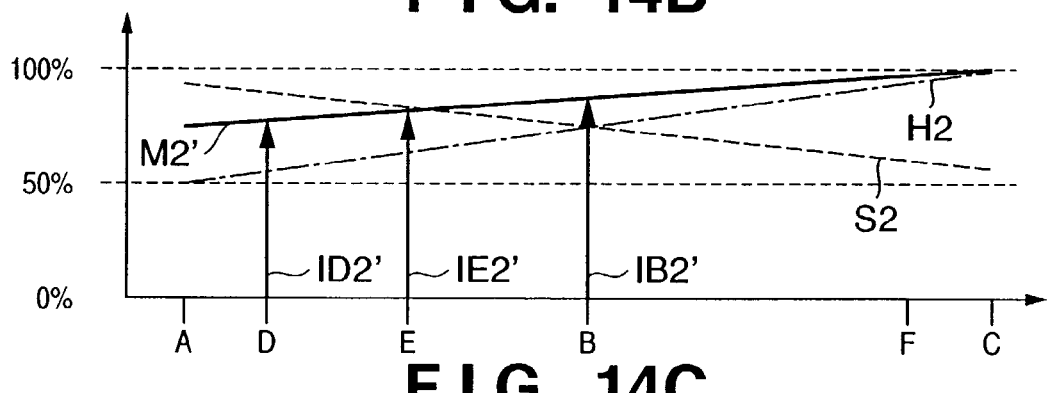
F I G. 14C
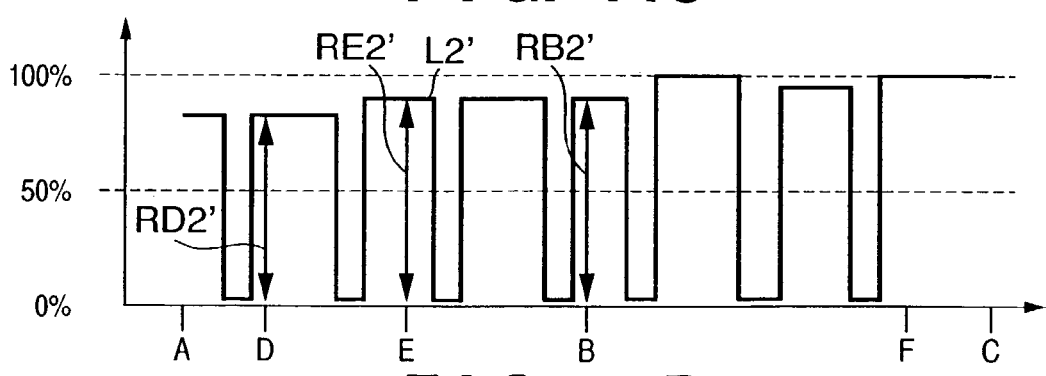
F I G. 14D

IMAGE INPUT APPARATUS, SUBJECT IDENTIFICATION SYSTEM, SUBJECT VERIFICATION SYSTEM AND IMAGE INPUT METHOD

FIELD OF THE INVENTION

The present invention relates to an image input apparatus, a subject identification system, a subject verification system and an image input method, and more particularly, to an image input apparatus and an image input method optimally mounted in subject identification systems for authenticating live subjects and subject verification systems such as bar code readers and the like.

BACKGROUND OF THE INVENTION

Conventionally, an image processing apparatus deletes shading data from a picture signal of a subject generated by a sensor in order to form that picture signal into an easily recognizable, high-resolution picture.

For example, in an image verification apparatus such as a scanner, more accurate authentication is achieved by removing non-uniformities, in other words shading, within the output unique to that apparatus using a correction circuit.

It should be noted that there are actually two types of shading. Specifically, there is dark shading due to photoelectric converter noise and unevenness in the black output with respect to a reference level. Additionally, there is light shading due to unevenness in the sensitivity of the light source, the optical system and/or the photoelectric converters as well as the form and reflectivity of the subject.

In order to correct this type of shading, shading correction data is stored in the apparatus as default values or shading correction data is produced by photographing a white reference member prior to the actual shooting.

However, a drawback of this type of shading correction according to the conventional art is that it requires a memory for storing the shading correction data and circuits for performing correction calculations, which increases the scale of the circuitry and its cost.

Moreover, the conventional art cannot cope with the complexity of the shading correction unique to live subject verification systems such as objection verification and fingerprint authentication systems. For example, in correcting for uneven lighting due to the shape of the subject, its reflectivity, its positioning and ambient light conditions, such verification systems cannot even read the white reference for storing same as a default setting. Rather, it is necessary for such systems to detect differences in uniformity in lighting between the bright natural light of the outdoors in daylight and light sources at night or indoors, and to adapt to such changes in ambient light levels appropriately.

However, without shading correction, the tone of the darker areas within a non-uniform brightness within a picture becomes inadequate and image accuracy deteriorates. On the other hand, increasing the brightness of the light source or the output gain of the sensor in order to obtain the tone of the darker areas saturates the brightest areas of the picture, again producing inadequate tone and a consequent loss of image accuracy.

SUMMARY OF THE INVENTION

Accordingly, the present invention is proposed to solve the above-described problem of the conventional art, and has as its object to provide an image input apparatus, subject recognition system, subject identification system and image input method bright enough to correct for uneven lighting due to the shape of the subject, its reflectivity, its positioning and ambient light conditions, yet without increasing the scale of the circuitry or its cost.

The above-described problem is solved and the above-described object is achieved, according to one aspect of the present invention, by an image input apparatus including an irradiation device for irradiating a subject; a sensor provided with a plurality of picture elements (pixels) for detecting light from the subject; a drive circuit for driving the sensor; and a controller for controlling the irradiation device so as to change irradiation conditions for a first region inside the sensor and a second region inside the sensor different from the first region.

In addition, the above-described problem is also solved and the above-described object of the present invention is also achieved by an image input method for irradiating a subject, detecting light from the subject using a sensor provided with a plurality of pixels and inputting an image, the method including the step of controlling the irradiation device so as to change irradiation conditions of a first region inside the sensor and a second region inside the sensor different from the first region.

Other objects and advantages besides those discussed above shall be apparent to those skilled in the art from the description of preferred embodiments of the invention that follows. In the description, reference is made to accompanying drawings, which form a part hereof, and which illustrate an example of the invention. Such examples, however, are not exhaustive of the various embodiment of the invention, and therefore reference is made to the claims that follow the description for determining the scope of the invention.

BRIEF DESCRIPTION OF THE DRAWINGS

FIGS. 5A, 5B and 5C are schematic diagrams showing the spatial relation between the subject, the light source and the sensor in the first embodiment of the present invention;

FIGS. 10A, 10B, 10C and 10D are diagrams illustrating the operation of the fingerprint identification apparatus according to the first embodiment of the present invention;

FIGS. 14A, 14B, 14C and 14D are diagrams illustrating the operation of the fingerprint identification apparatus according to the second embodiment of the present invention;

DETAILED DESCRIPTION OF THE PREFERRED EMBODIMENTS

Preferred embodiments of the present invention will be described in detail in accordance with the accompanying drawings.

First Embodiment

Figure 1:
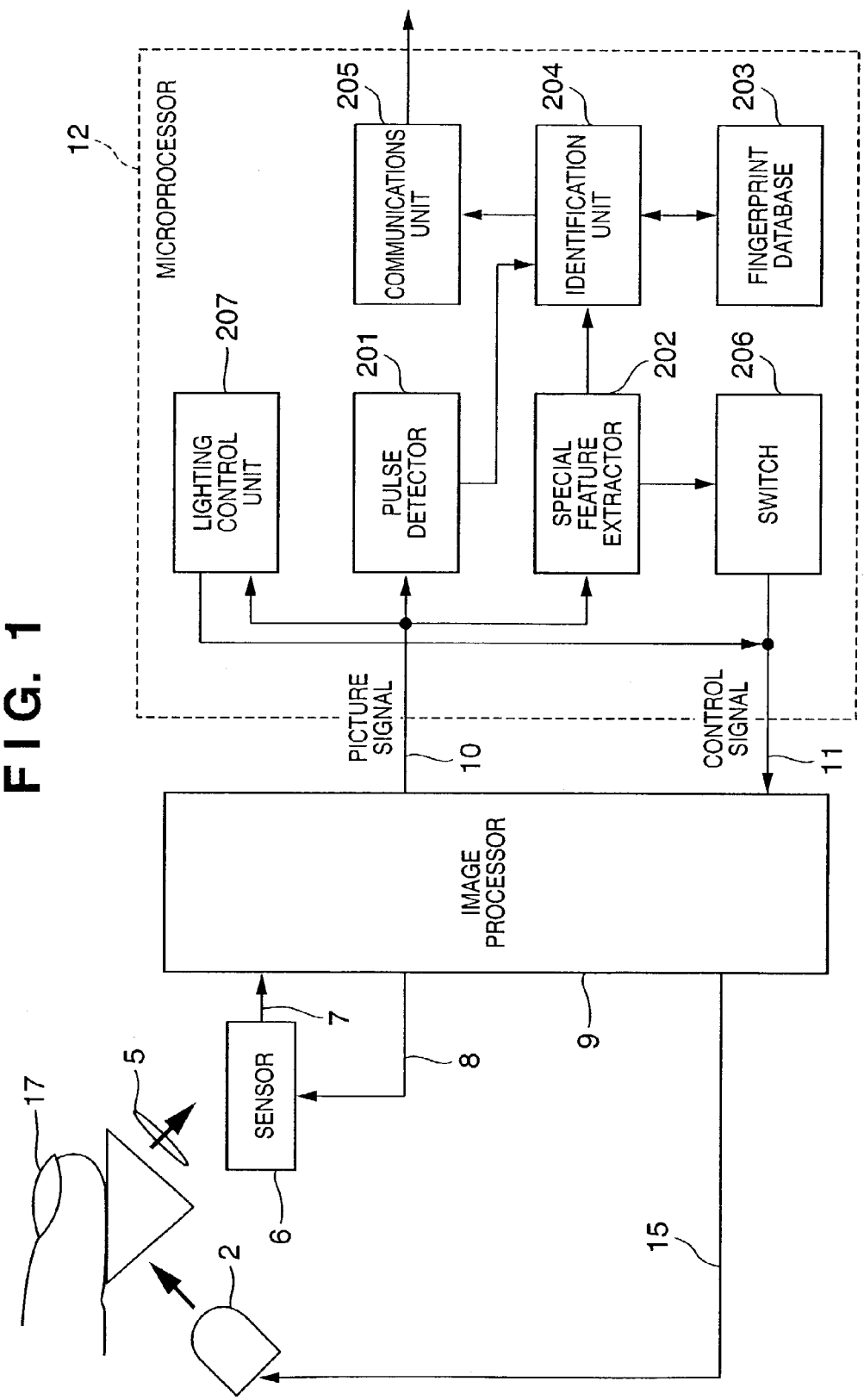
FIG. 1 is a block diagram of the schematic structure of a fingerprint identification apparatus according to a first embodiment of the present invention.

FIG. 1 is a block diagram of the schematic structure of a fingerprint identification apparatus according to a first embodiment of the present invention.

In FIG. 1, reference numeral 2 denotes an LED used as a light source for illumination (an irradiating means), reference numeral 5 denotes a lens 17 that focuses the light reflected from a finger 17, and reference numeral 6 denotes a sensor composed of a plurality of pixels such as CMOS-type CCDs. In the present embodiment, a CMOS area sensor is used, in which the pixels are aligned two dimensionally, in vertical columns and horizontal rows. Reference numeral 7 denotes a signal line that transmits picture signals from the sensor 6, reference numeral 8 denotes a control line through which a sensor drive pulse is output, reference numeral 9 denotes an image processor that processes the picture signals transmitted from the sensor 6 via the signal line 7, reference numeral 10 denotes a signal line that transmits picture signals from the image processor 9, reference numeral 11 denotes a control line for controlling the image processor, reference numeral 12 denotes a microprocessor for controlling the operations of the fingerprint identification apparatus Within the microprocessor 12, reference numeral 201 denotes a pulse detector for detecting whether or not the object to be verified is a finger based on the presence or absence of changes in the pulse of the picture signal, reference numeral 202 denotes a special feature extractor for extracting special features from the picture signal such as the tip of the ridges of a fingerprint, reference numeral 203 denotes a fingerprint database, reference numeral 204 denotes an identification unit that compares the positions of the special features extracted by the special feature extractor 202 when triggered by a determination by the pulse detector 201 that the picture signal is a human fingerprint with the fingerprints in the fingerprint database, reference numeral 205 denotes a communications unit for sending identification results to a host computer or the like via a network such as the Internet, and reference numeral 206 denotes a switch that controls the amount of light of the LED when the special feature extractor has been unable to adequately extract the special features and that controls the overall amp gain at the sensor 6 so that the amp gain falls appropriately within the dynamic range.

In addition, reference numeral 207 denotes an illumination amount controller (hereinafter called simply a controller) that controls the accumulated amount of charge stored at each pixel of the sensor in order to decrease the effect of the shading and increase tonal accuracy, as well as the amount of exposure within the area sensors disposed in two dimensions.

It should be noted that the shading here is the light shading caused by unevenness in the sensitivity of the light source, the optical system and/or the photoelectric converters as well as the form and reflectivity of the subject. In a fingerprint identification apparatus like that of the present embodiment, typical light shading exists in the disposition of the light source and the shape of the finger. Further, this unevenness in the amount of light changes depending on the lighting environment only in the case of the bright outdoor light of day and at night or with the light from an LED indoors.

It should be noted that the sensor 6 pixels may be disposed in a line, a matrix, a honeycomb or a delta arrangement.

Figure 2:
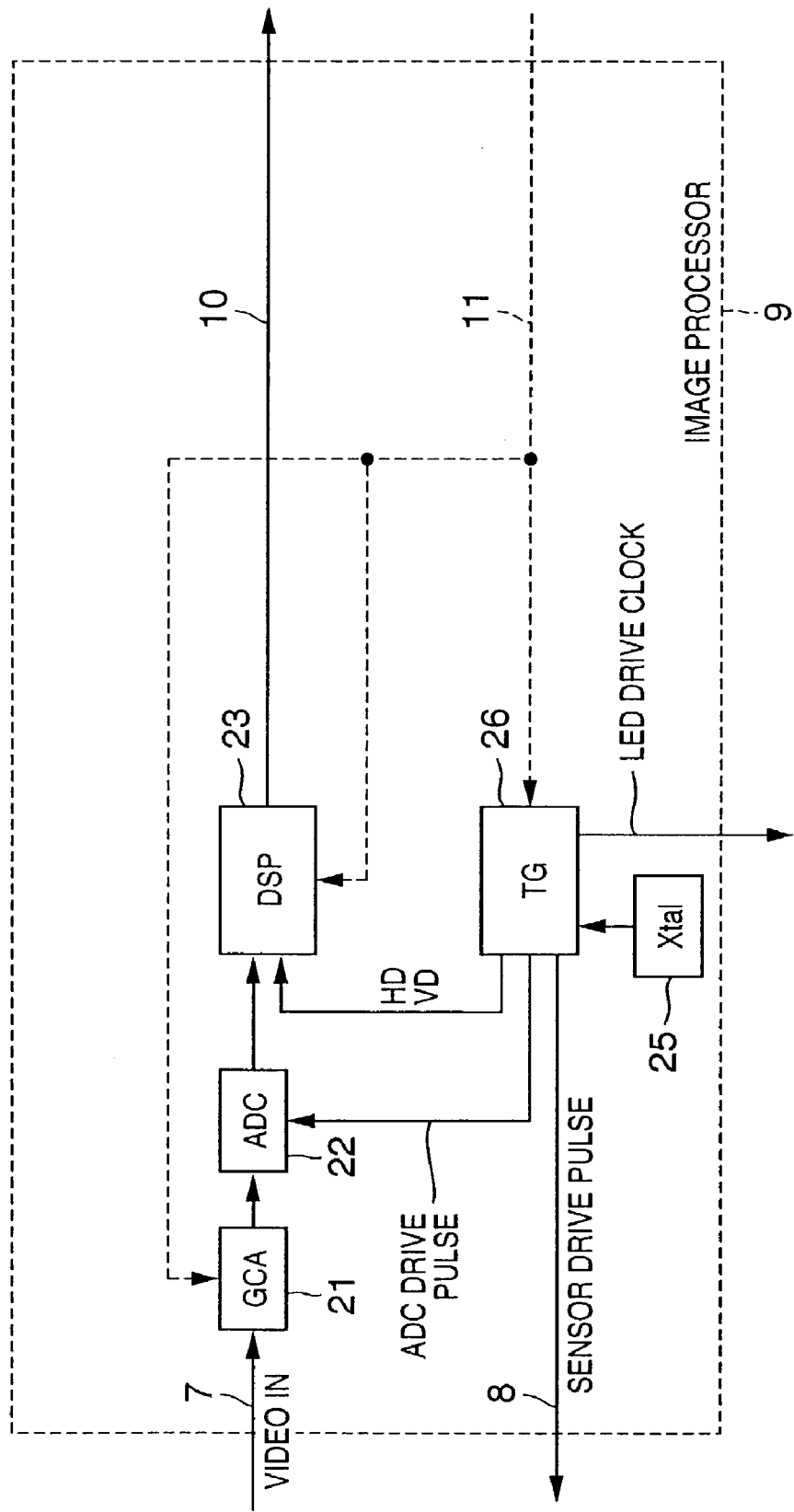
FIG. 2 is a block diagram showing the interior structure of an image processor of FIG. 1.

FIG. 2 is a block diagram showing the interior structure of an image processor of FIG. 1. In FIG. 2, reference numeral 21 denotes a gain control amp (GCA) that adjusts the gain of the picture signal input via the signal line 7. Reference numeral 22 denotes an analog digital converter (ADC) that converts the output of the GCA 21 from analog signals into digital signals. Reference numeral 23 denotes a digital signal processor (DSP) that processes the picture signal output from the ADC 22. The DSP 23 adjusts the picture quality through digital image processing such as contrast, edge emphasis and filtering.

Reference numeral 25 denotes a quartz crystal oscillator (Xtal) that generates a clock. Reference numeral 26 denotes a timing generator (TG) that generates a variety of drive pulses to the sensor 6, the ADC 22 and the DSP 23 based on the clock from the quartz crystal oscillator 25.

It should be noted that, although in the present embodiment the controller 207 that controls the amount of exposure light is located in the microprocessor, the controller 207 may instead be located in the TG 26.

Figure 3:
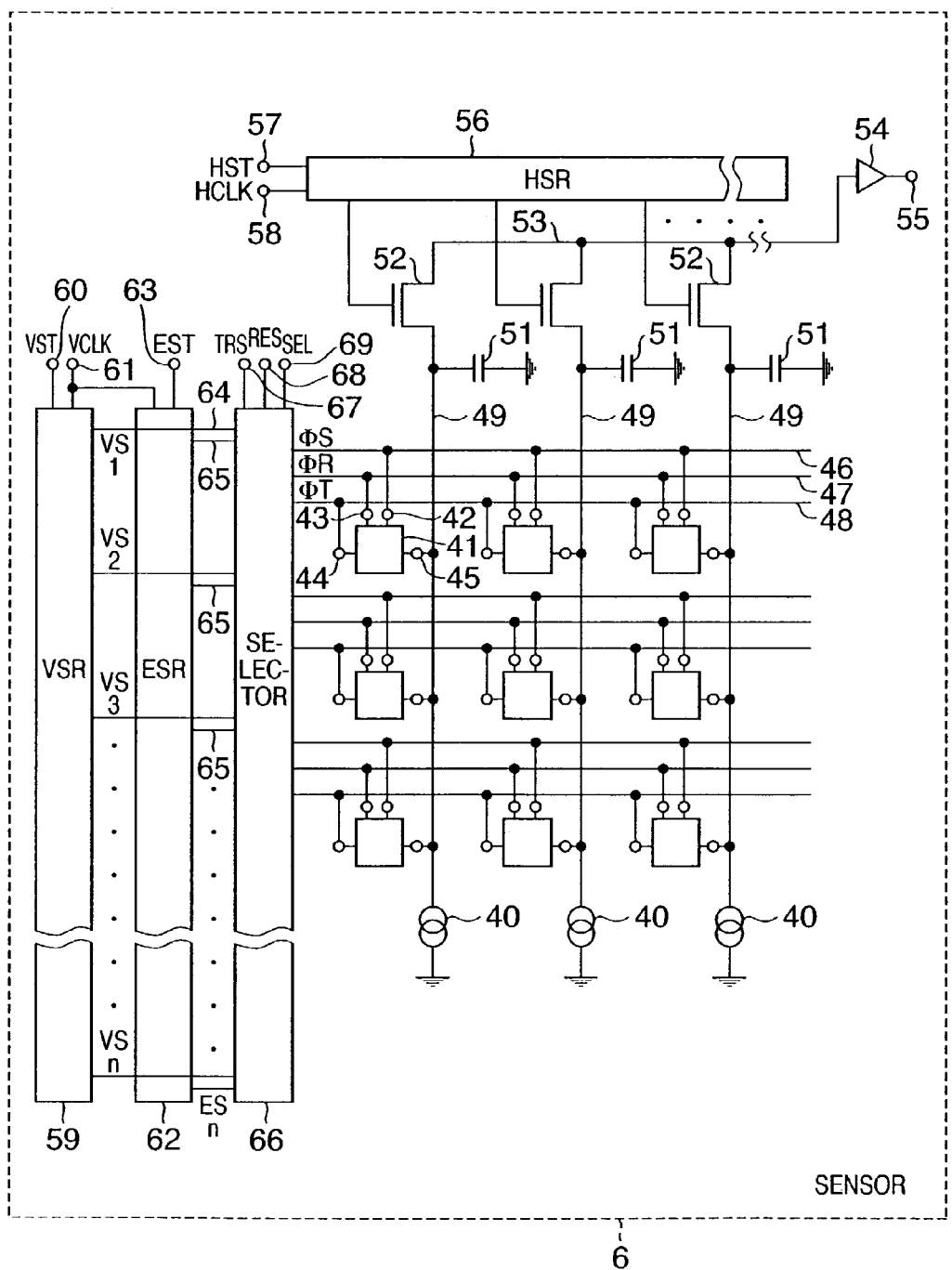
FIG. 3 is a block diagram of the internal structure of a sensor of FIG. 1.

FIG. 3 is a block diagram of the internal structure of a sensor of FIG. 1. In FIG. 3, reference numeral 41 denotes a pixel portion that comprises a single pixel of the sensor, reference numeral 42 denotes an input terminal ($\phi S$) for a readout pulse in the pixel portion 41, reference numeral 43 denotes an input terminal for a reset pulse ($\phi R$) in the pixel portion 41, reference numeral 44 denotes an input terminal for a transfer pulse ($\phi T$) in the pixel portion 41, reference numeral 45 denotes a signal read-out terminal (P0) in the pixel portion 41, reference numeral 46 denotes a signal line that sends the read-out pulse (φS) to the horizontal pixels (that is, a main scanning direction) from a selector to be described later, reference numeral 47 denotes a signal line for sending the reset pulse (φR) to the horizontal pixels from the selector to be described later, and reference numeral 48 denotes a signal line for sending the transfer pulse (φT) to the horizontal pixels from the selector to be described later. In addition, reference numeral 49 denotes a vertical signal line, reference numeral 40 denotes a constant current generator, reference numeral 51 denotes a capacitor connected to the vertical signal line 49, reference numeral 52 denotes a transfer switch of which the gate is connected to a horizontal shift register 56, the source is connected to the vertical signal line 49 and the drain is connected to an output signal line 53, reference numeral 54 denotes an output amplifier connected to the output signal line 53, and reference numeral 55 denotes an output terminal of the sensor 6.

In addition, reference numeral 56 denotes a horizontal shift register (HSR), reference numeral 57 denotes an input terminal of a start pulse (HST) for the horizontal shift register, reference numeral 58 denotes a transfer clock (HCLK) input terminal, reference numeral 61 denotes the input terminal of that transfer clock (VCLK), reference numeral 62 denotes an electronic shutter shift register (ESR) of a type called a rolling shutter to be described later, reference numeral 63 denotes an input terminal of a start pulse (EST) for the electronic shutter shift register, reference numeral 64 denotes an output line for the vertical shift register (VSR), reference numeral 65 denotes an output line for the electronic shutter shift register (ESR), reference numeral 66 denotes a selector, reference numeral 67 denotes an input terminal for the transfer pulse original TRS reference numeral 68 denotes an input terminal for the reset pulse original signal RES, and reference numeral 69 denotes an input terminal for the read-out pulse original signal SEL.

Figure 4:
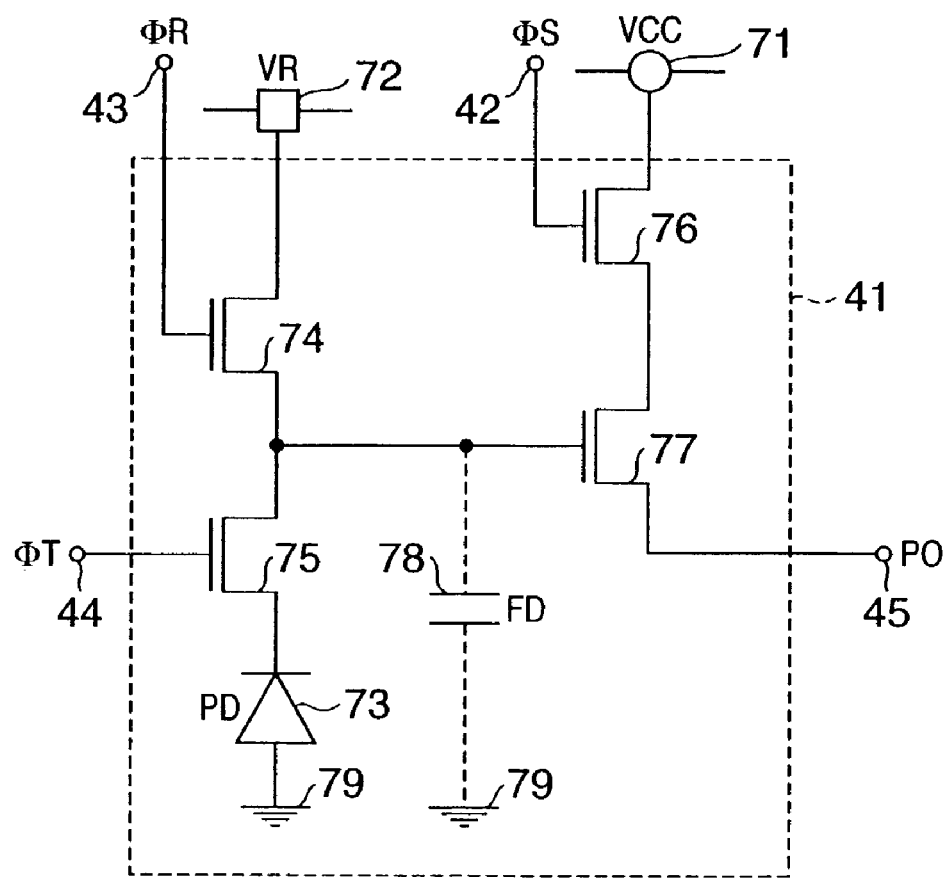
FIG. 4 is a block diagram of the structure of a picture element part of FIG. 3.

FIG. 4 is a block diagram of the structure of a picture element part of FIG. 3. In FIG. 4, reference numeral 71 denotes a power supply voltage (VCC), reference numeral 72 denotes a reset voltage (VR), reference numeral 73 denotes a photodiode, reference numerals 74–77 denote switches consisting of MOS transistors, reference numeral 78 denotes a parasitic capacitor (FD), and reference numeral 79 is a ground.

FIGS. 5A, 5B and 5C are schematic diagrams showing the spatial relation between the subject, the light source and the sensor in the first embodiment of the present invention, in which FIG. 5A is a plan view of a finger placed on a stand 20, FIG. 5B is a cross-sectional view thereof and FIG. 5C is a schematic diagram of the fingerprint image thus acquired. Reference numeral 27H denotes a horizontal scanning direction that is a main scanning direction of an area sensor arrayed in two dimensions and reference numeral 27V denotes a vertical scanning direction that is a sub-scanning direction. In addition, 27L is a direction in which the LEDs are arranged densely, and reference numeral 27S denotes the longer, longitudinal dimension of a finger. Points A–F denote points on the sensor.

As shown in FIG. 5A, the LEDs are for example arranged in two columns, with the stand 20 being designed so that the direction 27L in which the columns of LEDs 2 are arrayed and the longer longitudinal dimension 27S of the finger 17 coincide. Similarly, the stand 20 may also be designed so that the main scanning direction 27H of the sensor and the longer longitudinal dimension 27S of the finger 17 coincide.

By changing the amount of exposure light inside the surface of the sensor, the present embodiment reduces the impact of shading caused by the shape of the subject and ambient light conditions overlaying the data that is to be acquired and degrading the accuracy of the apparatus. Designing the apparatus so that the direction of alignment of the LED 2, the longer longitudinal dimension 27S of the finger 17 and the main scanning direction 27H of the sensor all coincide means that the shading shape at the sub-scanning direction 27V side of the sensor will have a high correlation with the main scanning direction 27H of the sensor.

A description will now be given of the operation of the sensor 6, with reference to FIGS. 3 and 4.

First, with the reset switch 74 and the switch 75 that is connected to a photodiode 73 turned OFF, an electric charge is accumulated at the photodiode 73 by incident radiation.

Thereafter, with the switch 76 in the OFF position, the switch 74 is turned ON, resetting the parasitic capacitor 78. Next, by turning the switch 74 OFF and the switch 76 ON, the electric charge resident in the reset state is read out at the signal read-out terminal 45.

Next, with the switch 76 OFF, the switch 75 is turned ON, causing the parasitic capacitor 78 to transfer the accumulated charge to the photodiode 73. Next, with switch 75 OFF, the switch 76 is turned ON, causing the signal charge to be read out at the signal read-out terminal 45.

The MOS transistor drive pulses φS, φR and φT, as will be explained later, are created by vertical shift registers 59, 62 and the selector 66, and supplied to the pixel input terminals 42–44 via the signal lines 46–48. For every pulse of the clock signal input from the input terminal 60, single pulses of each of the signals TRS, RES and SEL are input to the input terminals 67–69, and as a result the drive pulses φS, φR and φT are synchronized with the signals TRS, RES and SEL, respectively, and output. As a result, drive pulses φS, φR and φT are supplied to terminals 42–44.

The signal read-out terminals 45 are connected to the constant current generator 40 as well as to the vertical signal capacitors 51 and the transfer switches 52 by the vertical signal lines 49, and thereafter, according to the horizontal shift register 56 output, the transfer switches 52 are sequentially scanned, the signals of the vertical signal capacitors 51 are sequentially read by the output signal lines 53 and output from the output terminals 55 via the output amplifier 54. Here, the vertical shift register (VSR) 59 commences scanning with the start pulse (VST) 60 and the transfer clock (VCLK) 61 is sequentially transferred via the output line 64 as VS1, VS2, . . . VSn. In addition, the electronic shutter vertical shift register (ESR) 62 commences scanning with a start pulse (EST) input from the input terminal 63, and the transfer clock (VCLK) input from the input terminal 61 is sequentially transferred to the output line 65.

The sequence in which the pixel portions 41 are read is as follows: First, the first line in the vertical direction (that is, the sub-scanning direction) is selected and, in accordance with the horizontal shift register 56 scan, the pixel portions 41 connected in rows from left to right are selected and output. When the first line of output is finished, the second line is selected and, once again, in accordance with the horizontal shift register 56 scan, the pixel portions 41 connected in rows from left to right are selected and output.

Similarly, in accordance with sequential scanning of the vertical shift register, the 1st, 2nd, 3rd, 4th, 5th . . . nth lines are scanned from top to bottom to output a single screen image.

However, the sensor exposure interval is determined by the storage interval required for the imaging pixel to store a photoelectric charge as well as by the interval required for the light reflected from the subject to enter the imaging pixel.

Now a CMOS type sensor, unlike an IT (interline transfer)—type or FIT (frame-interline transfer)—type CCD element, is not equipped with a light-shielded buffer memory, so during the interval in which signals obtained from pixel portions 41 are being read out, pixel portions 41 that have not yet been read continue to be exposed. Accordingly, continuously reading out the screen output results in an exposure time that is substantially equivalent to the time it takes to read out a screen.

However, in such a state it is impossible to control the exposure interval. As one method of controlling an exposure interval a so-called rolling shutter drive method has been adopted, in which, in a CMOS-type sensor, the rolling shutter acts as the electronic shutter (that is, the focal plane shutter), commencing and completing charge storage as well as vertically scanning at the same time. Doing so makes it possible to set the exposure interval in units of vertical scan lines, for commencement and completion of charge storage. In FIG. 3, ESR 62 is a vertical scan shift register that resets the pixels and commences charge storage, and the VSR 59 is a vertical scan shift register that transfers electrical charge and completes storage. When using an electronic shutter function, the ESR 62 scans ahead of the VSR 59, and the interval between the two scans corresponds to the exposure interval.

Another method of controlling the exposure interval involves controlling the interval during which light from the subject enters the imaging pixels. There are two ways of obtaining this control: by using a mechanical shutter, and by controlling the illumination interval of the light source. In the present embodiment, the light source illumination interval (that is, the interval of time during which the subject is illuminated) is controlled so that the exposure interval is controlled within the screen.

Figure 6:
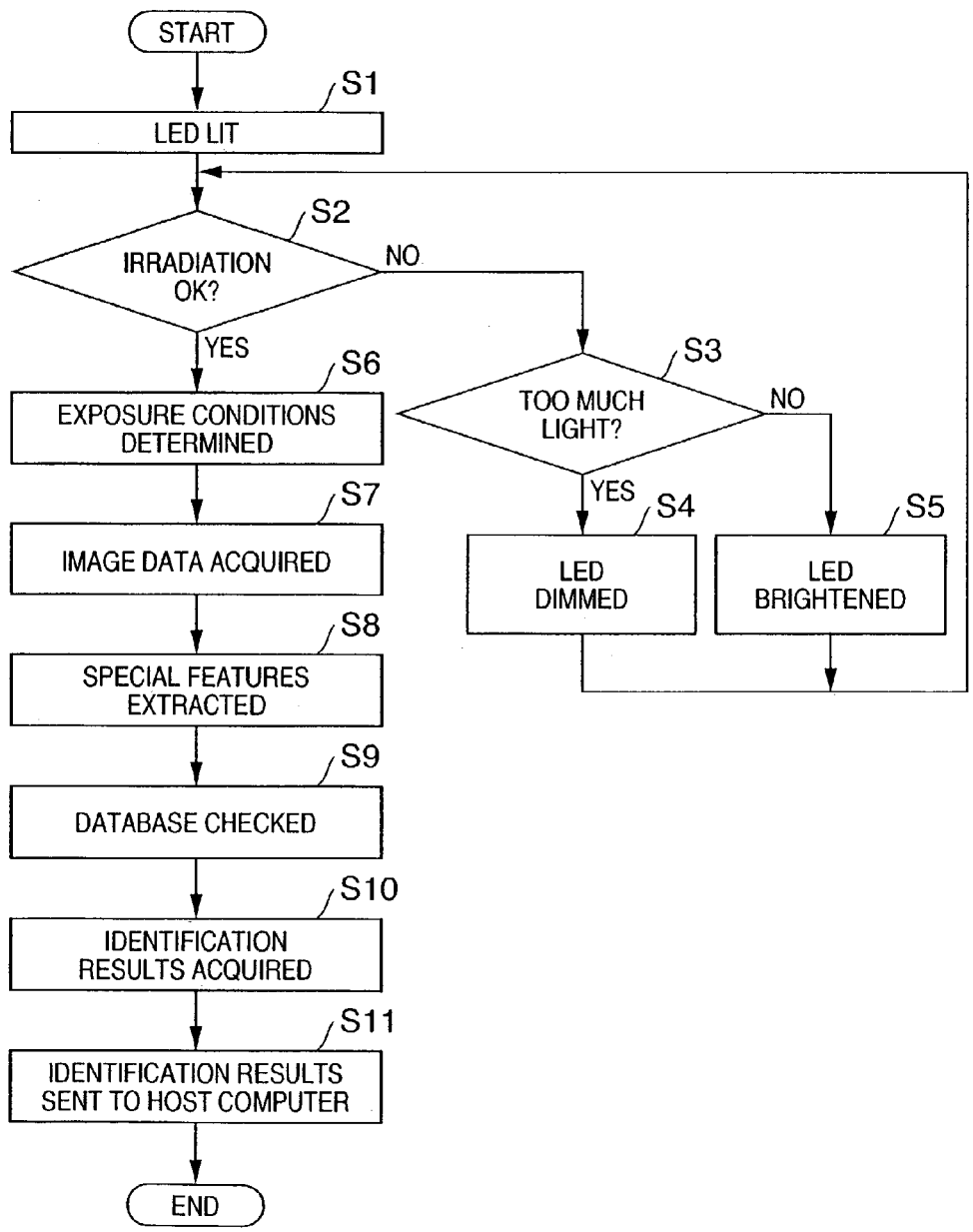
FIG. 6 is a flow chart illustrating processes performed by the fingerprint identification apparatus of FIG. 1.

FIG. 6 is a flow chart illustrating processes performed by the fingerprint identification apparatus of FIG. 1. Here, for sake of illustration, it is assumed that, for example, a cell phone is equipped with a fingerprint identification apparatus, and that the cell phone is used for connecting to the Internet and conducting electronic trading, with the fingerprint identification apparatus being used to confirm the identity of the caller in order to verify the trade.

Using FIG. 6, a description will be given of the operation of the apparatuses shown in FIGS. 1 and 2.

First, in a step S1, a triggering command is issued from the image processor 9 via the control line 15 to trigger the LED 2 (that is, to cause the LED 2 to light up).

Then, the finger 17 is illuminated by the light emitted from the LED 2, and the light reflected from the finger 17 is collected by the lens 5 and focused on the sensor 6. The sensor 6 then converts the reflected light into electrical signals, which it then transmits to the image processor 9 via the signal line 7 as picture signals.

The image processor 9 processes the picture signals output from the sensor 6 and outputs them to the microprocessor 12.

The microprocessor 12, in a step S2, then determines whether or not the amount of light emitted by the LED 2 is adequate, based on signals input from the controller 207.

If the results of that determination indicate that the brightness, contrast and the like of the image of the finger 17 are adequate for acquiring an image of the fingerprint, then the process proceeds to a step S6. If not, then the process proceeds to a step S3.

In step S3, it is determined whether or not the amount of light emitted by the LED 2 according to the controller 207 is greater than an amount needed to carry out decoding of the image of the finger 17.

If there is too much light, then a control signal is sent to the image processor 9 to reduce the amount of light emitted by the LED 2, for example in steps. The image processor 9, in accordance with the signal, then reduces the amount of light emitted in a step S4. Conversely, if there is not enough light, then a control signal is sent to the image processor 9 to increase the amount of light emitted by the LED 2, for example in steps. The image processor 9, in accordance with the signal, then increases the amount of light emitted in a step S5.

It should be noted that, instead of adjusting the amount of light emitted by the LED 2, the picture signal gain as determined by the GCA 21 may be adjusted instead. In that case, the point at which the amount of light emitted by the LED 2 is optimum is then set as the exposure condition in step S6.

Thereafter, when adjustment of the amount of light emitted is completed, the process proceeds to a step S3, image acquisition is conducted under the necessary imaging conditions, and imaging data is acquired in a step S7.

The imaging data acquired in step S7 is then processed for contrast and the like by the image processor 9, after which, in the same process as in the case of step S1, the processed imaging data is then sent to the microprocessor 12. The microprocessor 12 then outputs the read finger 17 image to the pulse detector 201 and the special feature extractor 202 in parallel.

The pulse detector 201 determines whether or not the object to be verified is a person's finger, based on the presence or absence of changes generated by a pulse in the picture signal. Similarly, the special feature extractor 202 extracts distinctive features such as the ridges of wrinkles of the fingerprint from the picture signal and outputs them to the identification unit 204 in a step S8.

The identification unit 204 then identifies the fingerprint by checking the database 203, using the spatial interrelation between the distinctive features supplied by the special feature extractor 202, in a step S9.

As described above, the results of the verification are obtained in a step S10.

Together with the pulse detector 201 detection results, the verification results so acquired are relayed to the host computer 4 on the vendor's side via the communications unit 205, in a step S11.

Ultimately, when the host computer 4 verifies the identity of the subject, for example, the amount of a purchase may then be withdrawn from the purchaser's bank account, which has already been obtained from the purchaser.

Using FIGS. 5A, 5B and 5C, as well as FIG. 7, FIGS. 8A, 8B, 8C and 8D, FIG. 9 and FIGS. 10A, 10B, 10C and 10D, a description will now be given of the operation of the present embodiment.

In order to facilitate an understanding of the invention, a description is first given of the related art.

Figure 7:
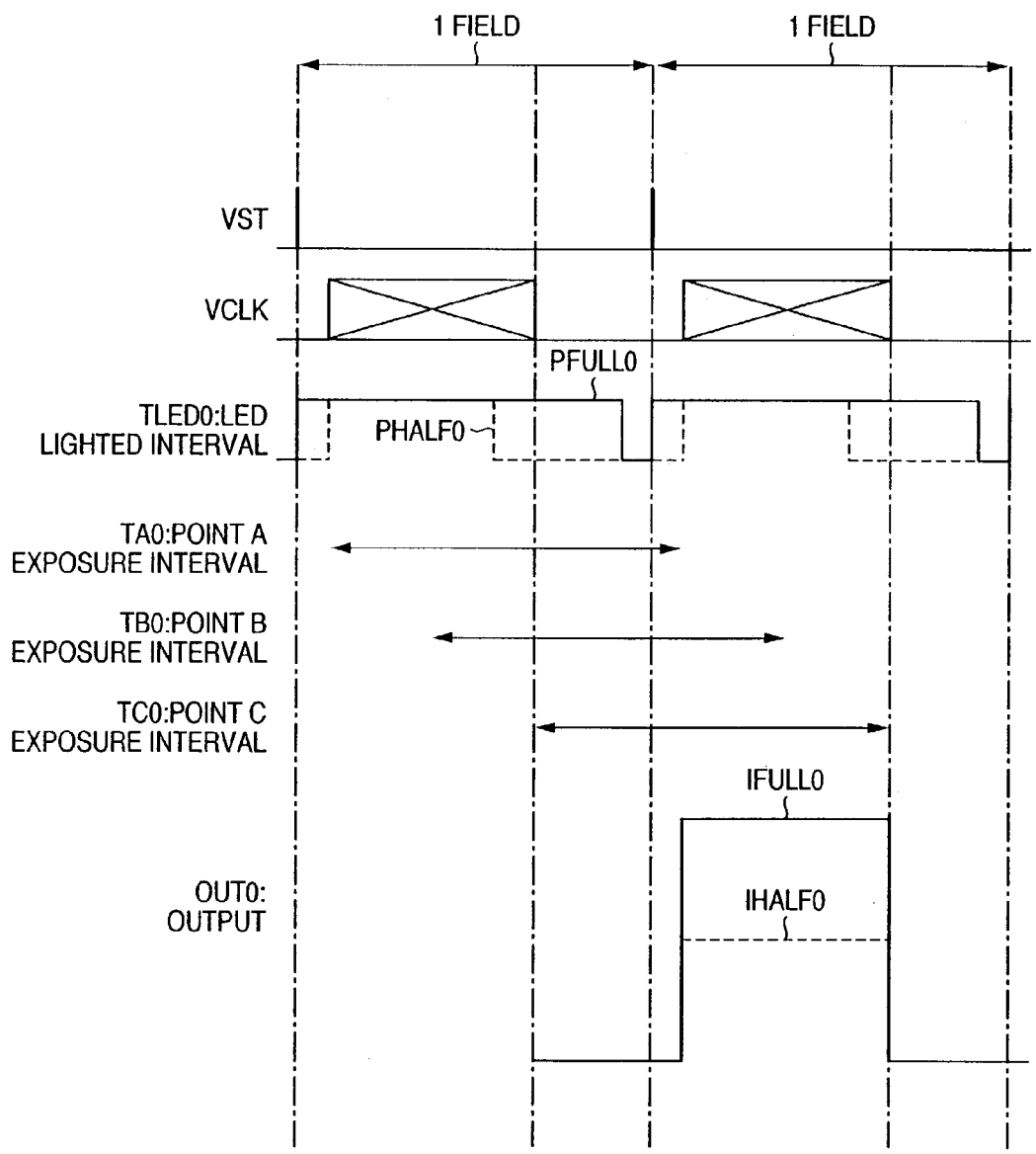
FIG. 7 is a timing chart showing sensor exposure in an ordinary fingerprint identification apparatus.

FIG. 7 is a timing chart showing sensor exposure in an ordinary fingerprint identification apparatus. FIGS. 8A, 8B, 8C and 8D are diagrams illustrating the operation of an ordinary fingerprint identification apparatus.

In FIG. 7, VST is the wave form of a start pulse 60 of the vertical shift register VSR of FIG. 3. VCLK is the transfer clock 61 of the vertical shift register VSR. In addition, TLED0 represents the LED 2 lighted interval, PFULL0 represents 100% lighted whereas PHALF0 represents 50% lighted. In FIG. 6, when changing the LED light amount in steps S4 and S5, the lighted interval is varied as described in order to accomplish that change in light amount. Similarly, TA0, TB0 and TC0 represent the exposure intervals at points A, B and C in FIG. 5C. At these points, at a row corresponding to a position in the vertical direction that is the sub-scanning direction of the sensor, the time from when such row is reset after being selected and read out by the preceding 1 field until it is then selected and read out again by the next field, is substantially the charge accumulation interval. Accordingly, in the typical operations shown in FIG. 7, the LED lighted interval is set to be equivalent to the scanning cycle of a single screen, so when the charge storage interval in a screen and the LED illumination interval are held substantially equal and the image of a uniform subject is being acquired, the output OUT0 of the sensor is a uniform exposure within the screen. In addition, IFULL0 is the output when the lighted interval is PFULL0 and IHALF0 is the output when the LED lighted interval is PHALF0.

Figure 8A:
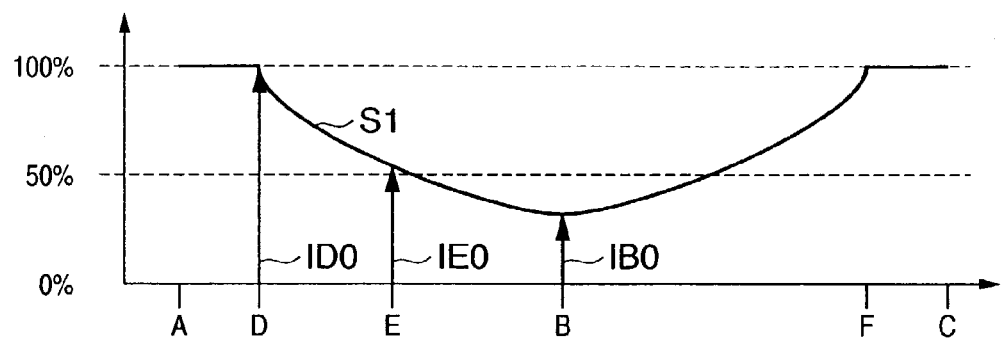
FIGS. 8A, 8B, 8C and 8D are diagrams illustrating the operation of an ordinary fingerprint identification apparatus.

FIGS. 8A, 8B, 8C and 8D show in schematic form the output when the fingerprint of FIG. 7 is imaged, in particular the intensity distribution of the sensor output over the line A-C of FIG. 5C. In FIGS. 8A though 8D, the vertical axis represents increments in sensor output intensity and the horizontal axis represents positions A–F on the line A-C of FIG. 5C.

S1 of FIG. 8A schematically indicates uneven lighting determined by the position of the LED 2 illumination and the shape of the finger, with IB0, ID0 and IE0 representing intensity at each of points B, D and E, respectively. Thus, even if the charge accumulation time and the LED emitted light amount are made the same as with TA0, TB0 and TC0 of FIG. 7, in actuality the amount of light that enters the sensor changes due to the physical distance between the LED and the finger and the shape of the finger, so uneven lighting does occur. IB0 here is approximately ⅓ of ID0.

Figure 8B:
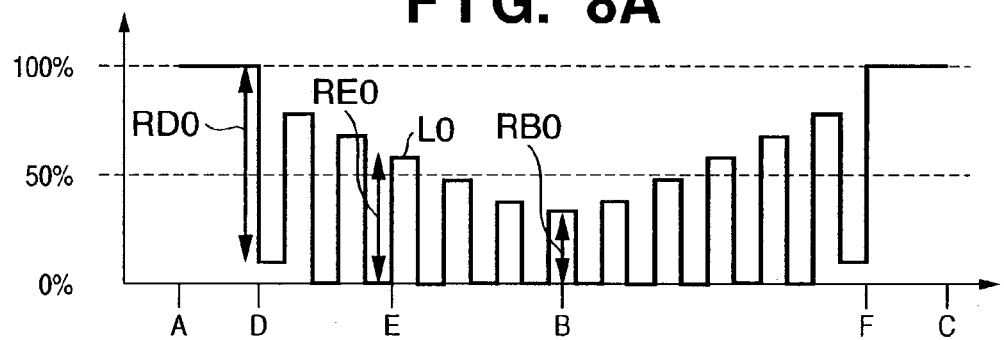

L0 of FIG. 8B shows schematically the intensity distribution of the sensor output when acquiring an actual fingerprint. The shading pattern caused by the uneven lighting is superimposed on an intensity pattern created by the ridges of the fingerprint. Here, RB0, RD0 and RE0 denote the intensity of the points B, D and E, respectively. Thus, because the uneven lighting S1 is superimposed on the acquired fingerprint pattern L0 as well, RB0 is approximately 30% the intensity of RD0. In addition, because the light is bright the low-intensity areas conversely become powdery. However, because the difference in brightness at RD0 is adequate, sufficient accuracy is obtained for processes at step 8 and thereafter. By contrast, tone is only 50% at RE0 and 30% at RB0, so without enough tones for processing the accuracy diminishes.

Figure 8C:
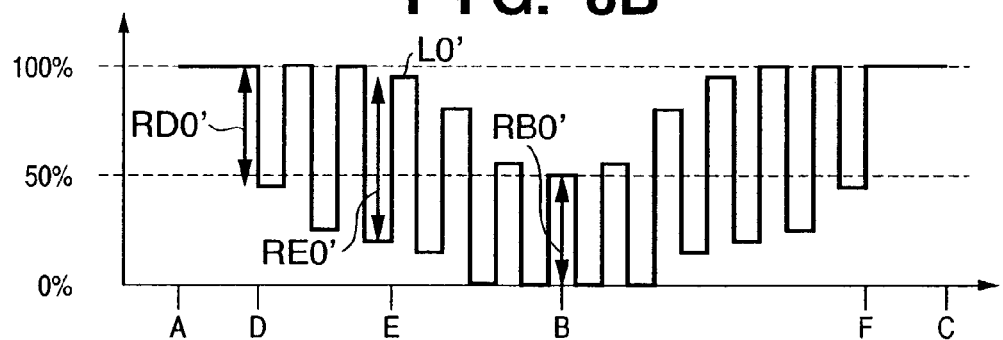

L0' of FIG. 8C is a schematic representation showing intensity distribution of the sensor output when the amount of illuminating light from the LED is greater than that of FIG. 8B, in which RB0', RD0' and RE0' are intensities at points B, D and E, respectively. For example, the state of FIG. 8B corresponds to a case in which it is determined that the light intensity is inadequate and the LED light amount has been increased in step S5. In such a case, although RE0' can retain a sufficient brightness level, tonality of only approximately 50% can be obtained at RB0', with the amount of light at RD0' conversely too great, causing saturation at the white side and at the same causing the black side to float with a tone of only some 50%. Thus, where unevenness in the amount of light exists, it becomes difficult to optimize the number of tones over the entire picture.

Figure 8D:
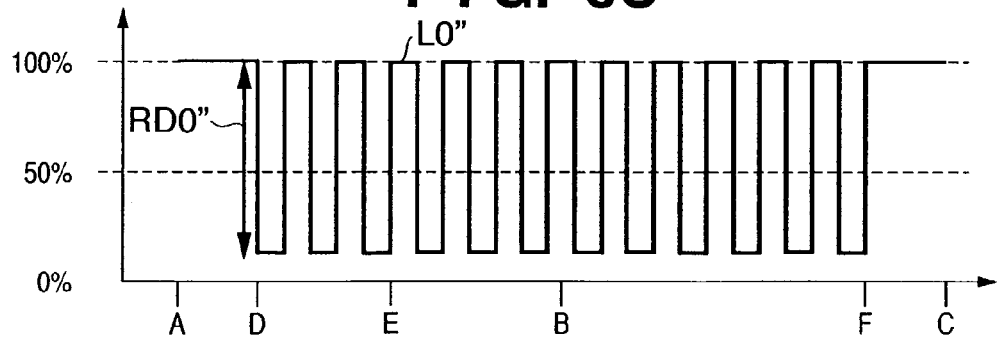

The L0" of FIG. 8D shows schematically the intensity distribution of the sensor output in a case in which the outdoor light is more controlling than the LED illumination. Here, RD0" denotes the intensity at point D, with substantially uniform output obtained at the other points as well. Thus, in the case of strong outdoor light, the impact of uneven lighting determined by the shape of the finger is reduced. As a result, in order to correct the uneven light of FIG. 8A, when correcting the shading with a computational circuit, unless the switch is made between correcting for illumination by a light source such as the LED and illumination by outdoor light, there will be an over-correction when it comes to the outdoor light. Similarly, when switching, the ability to detect outdoor light and to switch correction calculations accordingly are required, thereby increasing the scale of the circuitry.

Next, a description will be given of the operation of the present embodiment.

Figure 9:
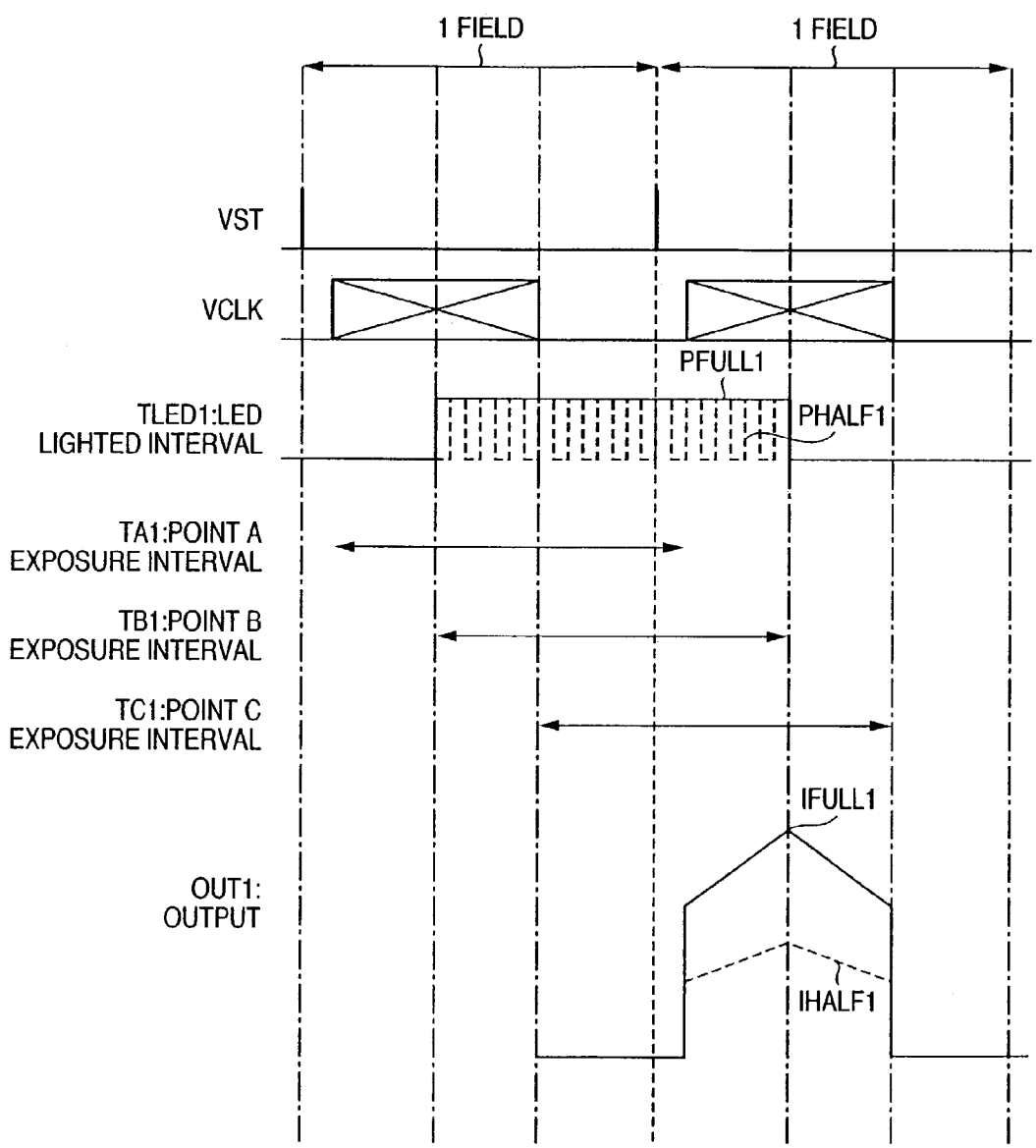
FIG. 9 is a timing chart showing sensor exposure in the fingerprint identification apparatus according to the first embodiment of the present invention.

FIG. 9 is a timing chart showing sensor exposure in the fingerprint identification apparatus according to the first embodiment of the present invention. FIGS. 10A, 10B, 10C and 10D are diagrams illustrating the operation of the fingerprint identification apparatus according to the first embodiment of the present invention.

In FIG. 9, VST is the wave form of the start pulse 60 of the vertical shift register VSR of FIG. 3 and VLCk is the transfer clock 61 of the vertical shift register VSR. In addition, LED 1 expresses the lighted interval of LED 2, where PFULL1 denotes 100% lighting while PHALF1 denotes 50% lighting. In FIG. 6, when changing the LED light amount in step S4 and step S5, in the present embodiment, as thus described, within a certain lighted interval PFULL1 the pulse width is further varied so as to vary the overall amount of light. In addition, TA1, TB1 and TC1 denote exposure intervals of points A, B and C shown in FIG. 5C. At these points, at a row corresponding to positions in the vertical direction that is the sub-scanning direction of the sensor, the time from when such row is reset after being selected and read out by the preceding field until it is then selected and read out again by the next field, is substantially the charge accumulation interval. Accordingly, in the operations of the present embodiment as shown in FIG. 9, because the scanning cycle of a single screen is longer than the field interval and the LED lighted interval that is the lighting condition (that is, the time during which the subject is illuminated) changes, although the charge accumulation interval of the sensors inside the screen is constant, the LED lighted interval during the charge accumulation interval is different, and so exposure conditions within the screen differ. Even when acquiring the image of a uniform subject, as shown with IFULL1, the sensor output OUT1 changes within the screen. IFULL1 is the output when the LED lighted interval is PFULL1 and IHALF1 is the output when the LED lighted interval is PHALH1. The image processor 9 TG unit carries out the control that causes the LED lighted interval lighting condition to change while the cycle is greater than a field interval. It should be noted that although in the present example the lighted interval is set so as to straddle two fields in order to handle the uneven lighting of FIG. 8A, in actuality the lighted interval is set as appropriate in order to offset uneven lighting due to the nature of the subject or the arrangement of the LEDs.

The setting of the lighted interval is carried out by a process of trial and error during the design stage, with the amount of shading correction required being determined, for example, by the sensor surface, the average size of a human finger, the disposition of the LEDs and the set light amount.

Or, the amount of correction required can be calculated each time an image is acquired, by a preliminary exposure of the subject and a measurement of the extent of shading during operation of the equipment.

FIGS. 10A, 10B, 10C and 10D are diagrams illustrating the operation of the fingerprint identification apparatus according to the first embodiment of the present invention. In FIGS. 10A–10D, the vertical axis represents the sensor output strength and the horizontal axis represents the positions of points A–F of line A-C of FIG. 5C.

S1 of FIG. 10A schematically depicts uneven lighting determined by the position of the LED 2 illumination and the shape of the finger, with H1 showing the proportion of the LED illumination interval. M1 represents the combination of S1 and H1, and indicates the exposure ratio of the imaging elements. IB1, ID1 and IE1 indicate intensity at points B, D and E, respectively. Thus changing the lighting interval of the LED during the charge accumulation intervals TA1, TB1 and TC1 of FIG. 9 reduces uneven lighting caused by the physical distance between the LED and the finger and the shape of the finger and brings the exposure conditions within the screen closer to uniformity.

L1 of FIG. 10B shows schematically the intensity distribution of the sensor output when acquiring an image of a fingerprint when uneven lighting has been reduced by changing the LED lighting interval as shown in FIG. 10A. The differences in the amount of exposure light of FIG. 10A are superimposed on the intensity pattern created by the ridges of the fingerprint (that is, the unevenness of the fingerprint). Here, RB1, RD1 and RE1 denote intensity at the points B, D and E, respectively. Thus, the acquired fingerprint pattern L1 has not as many output level differences within the screen as L0. It should be noted that, in order to make the exposure uniform within the screen, the overall brightness level has been reduced and RD1 has approximately 50% the intensity of RD0. Where there are an insufficient number of tones for processing and accuracy diminishes, the number of effective tones of the signal can be increased by increasing the electric current to the LED and thereby increasing the amount of light emitted itself, or by increasing the amp gain after sensor output, that is, by broadening the dynamic range of the signal amplitude to the fullest extent.

Such control is carried out in steps S3 through S6 of FIG. 6, depending on the subject and the ambient lighting conditions.

Where outdoor light is controlling, the output across the screen is substantially uniform regardless of the exposure interval of the light source, so the system is designed so that even maximum brightness such as that experienced during clear, sunny weather will not exceed the upper limits of the dynamic range, the LED 2 are also lit when the output is low and the current to the LED 2 is adjusted so that the signal amplitude matched the dynamic range as in steps S3 through S6. Or, depending on the output values in the screen, the amp gain after sensor output is adjusted so that the signal amplitude matched the dynamic range as in steps S3 through S6. By so doing, the present invention can handle both indoor artificial lighting and nighttime light as well as bright outdoor light that is controlling.

M1' of FIG. 10C is the amount of LED light at Ml of FIG. 10A, or the proportion of exposure light when the amp gain after sensor output has been approximately doubled. IB1', ID1' and IE1' are intensities at points B, D and E.

L1' of FIG. 10D is a schematic representation of intensity distribution of sensor output in a case in which the LED light or the amp gain has been approximately doubled. Here, RB1', RD1' and RE1' are intensities at points B, D and E, respectively. Thus, the acquired fingerprint pattern L1' shows few differences in output in the screen, and moreover, the signal amplitude is as broad as the dynamic range, so the number of tones is sufficient and highly accurate data can be obtained.

In an embodiment such as the present one, controlling the amount of exposure light inside the screen so as to offset the effects of uneven lighting (=light shading) caused by lighting conditions or the shape of the finger means that a fully adequate number of tones across the entire screen. In the present embodiment, in which lighting conditions within the screen change because the present embodiment changes the lighting interval of the light source, there is no over-correction even when outdoor light is controlling, and there is no particular need to detect and switch correction for outdoor lighting. In addition, the circuitry for controlling the exposure light within the screen is limited to just controlling the timing of the light source, so there are virtually no increase in cost.

Japanese Laid-Open Patent Application No. 07-273949 discloses providing a shading correction plate for correcting shading within the screen. However, since this reference contemplates scanner application, there is no provision for correcting for the effects of outdoor light, and cannot accommodate the ambient changes and subjects that the present invention contemplates as the technical problem to be solved. Japanese Laid-Open Patent application No. 09-113957 discloses a method for controlling an exposure amount within the screen by mechanical shutter. However, this method requires a detection of a special environment and a switching of a control operation, for accommodating to a kind of a subject and changing of environment. In addition, because the shutter is mechanical, a mechanism for controlling the shutter speed at the level of the screen is required, thus increasing the cost and the scale of the apparatus.

It should be noted that, with the present embodiment, a highly accurate image can be acquired with just a simple lighting control circuit, without performing conventional shading correction by computational circuit and without the conventional large-scale memory. Therefore, the sensor 6 and the image processor 9 can easily be achieved on a single chip. In particular, by putting these components on a single chip, the present invention can be made smaller, which makes desirable their adoption in cell phones, laptop computers, PDAs and other, similar apparatuses in which a premium is placed on portability.

In addition, although the present embodiment has been described with reference to a system for verifying the identity of a person from an image of a fingerprint, in actuality the present embodiment is not limited to such application but can be similarly employed in systems that seek to verify the identity of a person from the blood vessels of the eye, the contour of the face, the shape and size of the hand, and so forth.

Second Embodiment

A description will now be given of a second embodiment of the present invention, with reference to the accompanying drawings.

As the second embodiment, the present invention will be describe using the example of a subject verification apparatus used for subject verification. Products that use subject verification include optical character recognition (OCR) apparatuses that acquire a character image, identify which character the image corresponds to and converts the image to ASCII code or the like, as well as visual devices for robots used in entertainment and in industrial uses to perform a variety of tasks and bar code readers that read and encode bar code images. In each case, the ability to accurately identify the object without regard to ambient lighting is more important that getting a high-quality picture. In addition, there are now an increasing number of opportunities to mount such subject identification systems on portable terminals such as the new handy-type bar code reader, so these systems must be made smaller and cheaper. In this sense as well, employing the present invention can provide highly accurate subject verification apparatuses that are also small and inexpensive.

Figure 11:
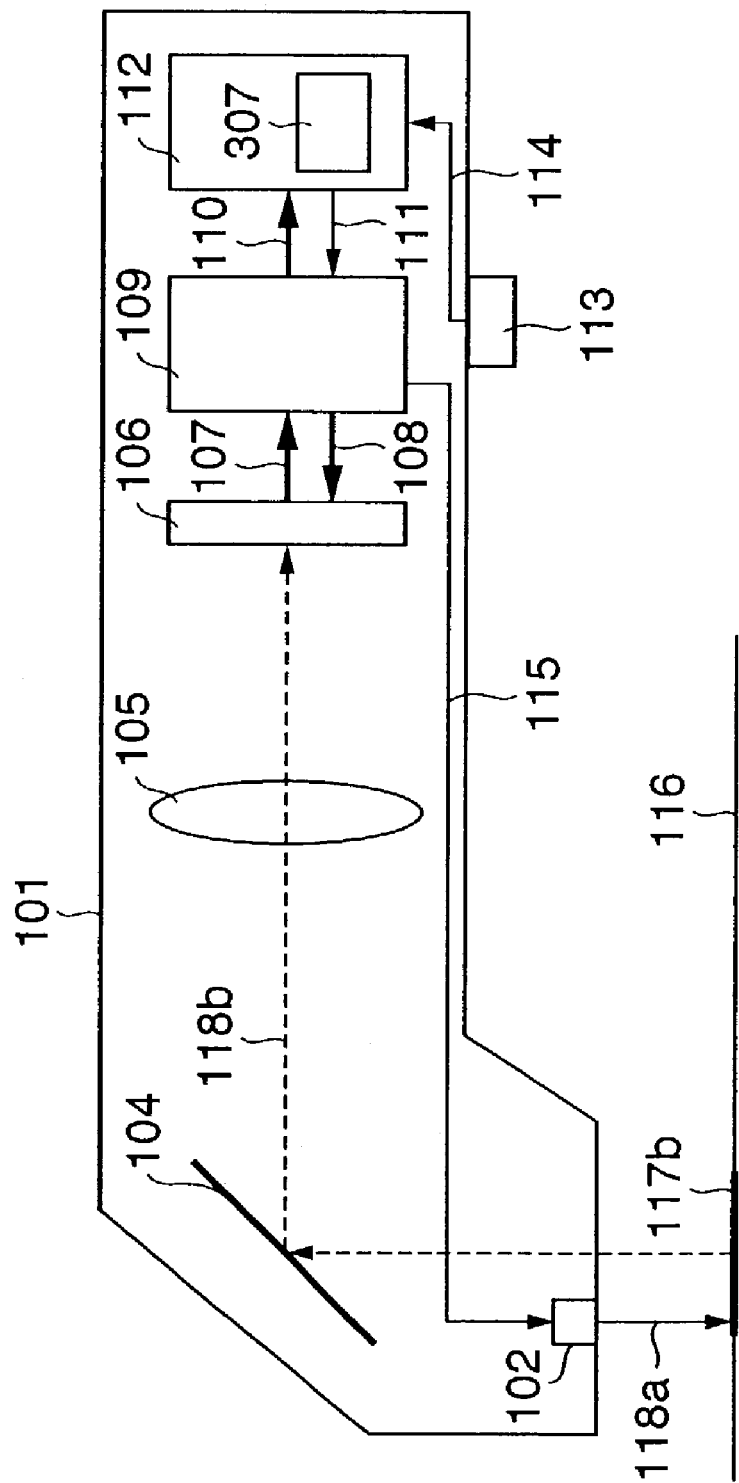
FIG. 11 is a block diagram illustrating the schematic structure of a handy-type bar code reader according to a second embodiment of the present invention.

FIG. 11 is a block diagram illustrating the schematic structure of a handy-type bar code reader according to a second embodiment of the present invention.

In FIG. 11, reference numeral 101 denotes the bar code reader itself, reference numeral 102 denotes an LED light source, reference numeral 104 denotes a mirror that changes the path of the reflected light 118*b* of the light 118*a* emitted from the LED 102, reference numeral 105 denotes a lens that focuses the reflected light 118*b* whose path has been changed by the mirror 104, reference numeral 106 denotes a sensor having imaging elements such as CMOS-type CCDs, reference numeral 107 denotes a signal line from the sensor 106 that transmits picture signals, reference numeral 108 denotes a control line for transmitting signals that drive the sensor 106, reference numeral 109 denotes an image processor that processes picture signals from the sensor 106, reference numeral 110 denotes a signal line for transmitting the picture signals processed by the image processor 109, reference numeral 111 denotes a control line for sending signals for controlling the image processor 9, reference numeral 112 denotes a microprocessor for controlling the operations of the bar code reader, reference numeral 113 denotes a control switch, reference numeral 114 denotes a signal line from the control switch 113 to the microprocessor 112, reference numeral 115 denotes a control line for transmitting signals for controlling the amount of light emitted by the LED 102, reference numeral 116 denotes a read object recorder, reference numeral 117*b* denotes a bar code written on the recorder 116, reference numeral 118*a* denotes illuminating light from the LED 102, and reference numeral 118*b* denotes reflected light proceeding along the optical path of the bar code reader 101. Here, like the first embodiment, the sensor 106 employs a CMOS-type area sensor of a configuration like that shown in FIG. 3 and FIG. 4. In addition, the interior of the image processor 109 has the same configuration as that of the first embodiment. In addition, the microprocessor 112 contains a controller that issues an instruction to change the amount of light within the screen, which is synchronized with the sensor scan of the TG unit in the image processor 109 via the control line 111 and controls the LED light amount via the control line 115. Inside the microprocessor 112, product information and the like corresponding to the bar code information is already stored in the memory. A recognition means reads from the memory the product information that corresponds to the bar code that are read. The recognition means then recognizes the object supplied with the bar code. The recognition results, as with FIG. 1 depicting the first embodiment of the present invention, can be sent to a host computer via a network such as the Internet from a communications unit.

In addition, reference numeral 307 denotes a controller for controlling the amount of charge stored in each of the imaging pixels of the sensor in order to reduce the effects of shading and increase tonal accuracy and the like. In the present embodiment, in order to control the amount of exposure light within the surface of the area sensors arranged two dimensionally, the brightness of the LED (that ism the intensity of the light directed toward the subject) is changed in synchrony with the sensor sub-scanning. Specifically, the digital control signal that controls the current that flows to the LED, for example, is D-A converted into analog control voltage and the LED current generated by a constant current circuit is adjusted, thus changing the brightness of the light emitted by the LED. The pixels are exposed at an integral of the amount of light from the subject during the exposure interval, so, as with the first embodiment, light shading is reduced by adjusting within the screen so as to offset uneven lighting due to the relative positions of the light source and the subject, for example.

Figure 12A:
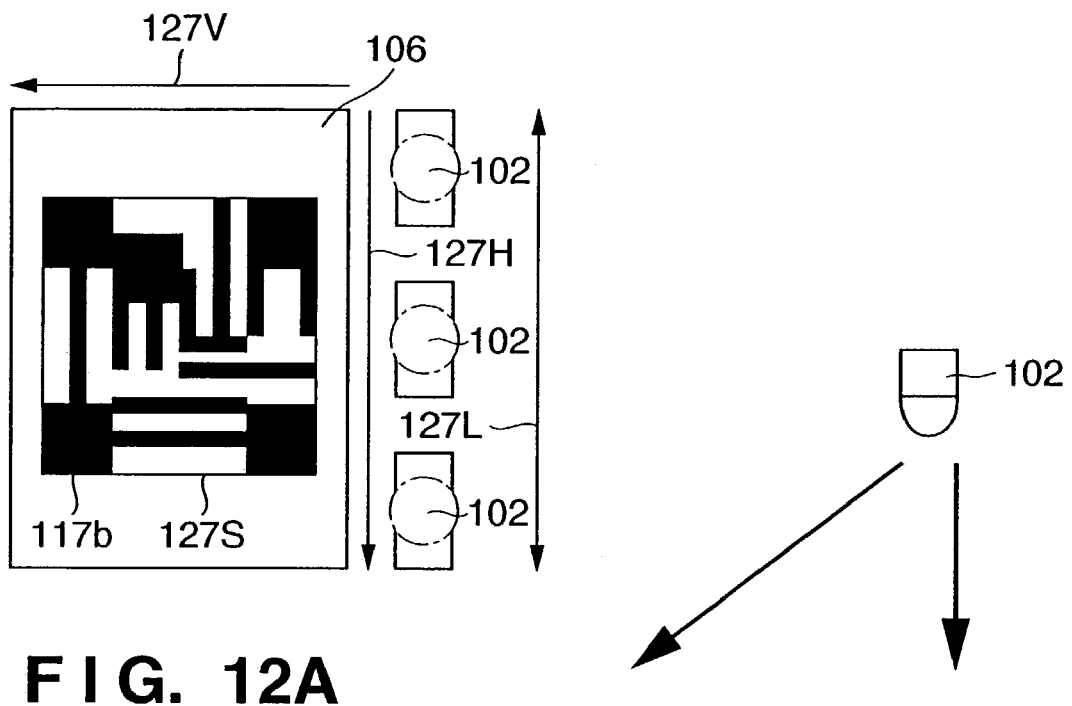
FIGS. 12A, 12B and 12C are schematic diagrams showing the spatial relation between the subject, the light source and the sensor in the second embodiment of the present invention.
Figure 12B:
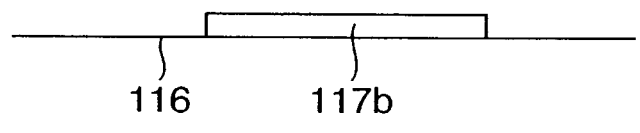
Figure 12C:
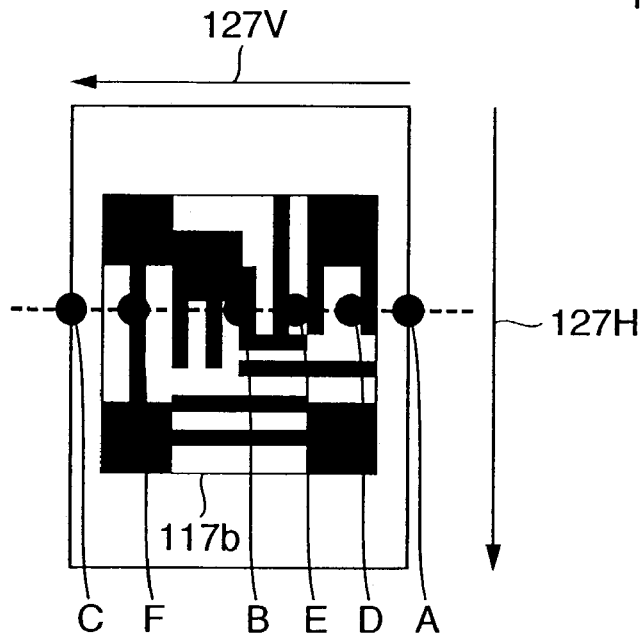

FIGS. 12A, 12B and 12C are schematic diagrams showing the spatial relation between the subject, the light source and the sensor in the second embodiment of the present invention. FIG. 12A is a plan view. FIG. 12B is a side view of that which is depicted in FIG. 12A. FIG. 12C is a schematic representation of a bar code image that has been acquired. Reference numeral 127H denotes a horizontal scanning direction that is also the main scanning direction of the area sensors arrayed along two dimensions. Reference numeral 127V denotes a vertical scanning direction that is also a sub-scanning direction. In addition, reference numeral 127L is a direction in which LEDs are densely arrayed. In addition, points A–F are points on the sensor. As shown in FIG. 12B, uneven lighting occurs due to the physical distance between the LED 102 and the bar code 117*b*.

Here, as shown in FIG. 12A, the LED 102 is arranged in a single row, and the whole may be designed so that the LED 102 alignment direction 127L and the sensor main scanning direction 127H coincide.

In the present embodiment, shading caused by the shape of the subject and the ambient lighting environment overlaps the data to be acquired, thus diminishing accuracy. This diminishing effect is itself reduced, however, by changing the amount of exposure light of the sensors in the screen. Designing the apparatus so that the direction of alignment of the LED 102 and the main scanning direction of the sensor coincide has the effect of making it possible to control the shape of the shading toward the sensor sub-scanning direction 127V, by controlling the light source at the speed of the sub-scan, which is slower that the speed of the main scanning direction. As a result, improvements in the uniformity of output across the entire screen the can be easily achieved with a simple circuit.

Figure 13:
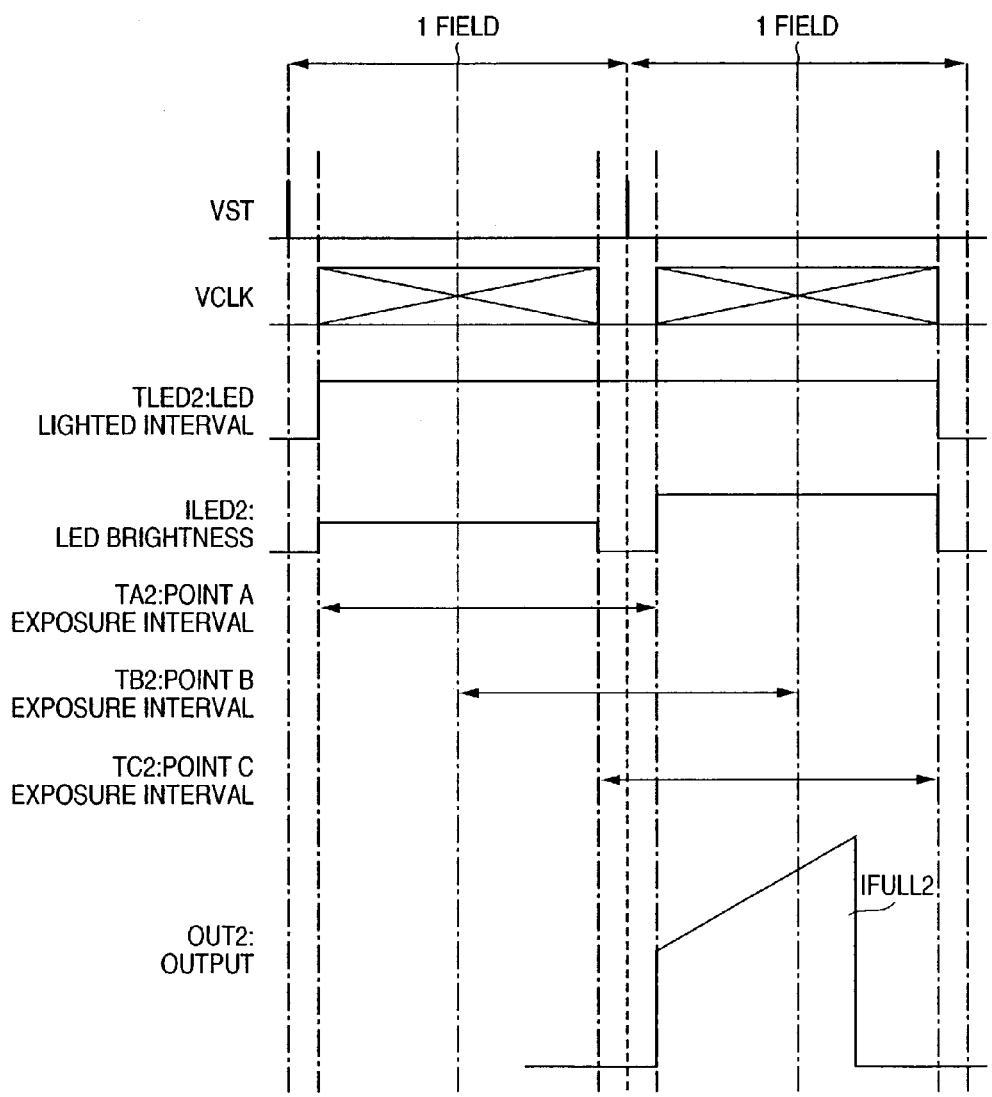
FIG. 13 is a timing chart showing sensor exposure operation in the fingerprint identification apparatus according to the second embodiment.

FIG. 13 is a timing chart showing sensor exposure operation in the fingerprint identification apparatus according to the second embodiment. FIGS. 14A, 14B, 14C and 14D are diagrams illustrating the operation of the fingerprint identification apparatus according to the second embodiment of the present invention.

In FIG. 13, the VST is the wave form of a start pulse 60 of the vertical shift register VSR of FIG. 3. VCLK is the transfer clock 61 of the vertical shift register VSR. In addition, TLED2 represents the LED 102 lighted interval. Similarly, TA2, TB2 and TC2 represent the exposure intervals at points A, B and C shown in FIG. 12C. At these points, at a row corresponding to positions in the vertical direction that is the sub-scanning direction of the sensor, the time from when such row is reset after being selected and read out by the preceding field until it is then selected and read out again by the next field, is substantially the charge accumulation interval. Accordingly, in the operation of the present embodiment as shown in FIG. 13, the scan cycle of a single screen is longer than a field cycle and the LED brightness that is the illumination condition changes (in this case, the LED brightness changes over two field intervals), so although the sensor charge accumulation time within the screen remains constant, the integral value of the brightness of the LED during charge accumulation interval changes, and thus the exposure conditions within the screen change. Even when imaging a uniform subject, as shown in IFULL2 the sensor output OUT2 changes within the screen.

FIGS. 14A, 14B, 14C and 14D are schematic renderings of the output when acquiring an image of a bar code by changing the brightness of the LED as shown in FIG. 13. Here, the intensity distribution of the sensor output over the line A-C of FIG. 12C. In FIGS. 14A, 14B, 14C and 14D, the vertical axis represents increments in sensor output intensity and the horizontal axis represents positions A–F on the line A-C of FIG. 5C.

S2 of FIG. 14A schematically indicates uneven lighting determined by the position of the LED 2 illumination and the subject, with IB2, ID2 and IE2 representing intensity at each of points B, D and E, respectively. Thus, changing the brightness of the LED during the charge accumulation interval of TA2, TB2 and TC2 reduces uneven lighting caused by the physical distance between the LED and the bar code, making exposure conditions within the screen more nearly uniform.

L2 of FIG. 14B shows schematically the intensity distribution of the sensor output when acquiring a bar code when changing the brightness of the LED as shown in FIG. 14A. The difference in the exposure amount of FIG. 14A is superimposed on the intensity pattern created by the bar code pattern. Here, RB2, RD2 and RE2 denote the intensity of the points B, D and E, respectively. Thus, the read bar code pattern L2 shows a reduction in the effects of the S2 shading. However, the overall brightness level has been decreased in order to make the exposure amount uniform within the screen. In order to increase the number of effective tones in the signal when the number of tones required for processing is insufficient and the accuracy diminishes, the overall current flowing to the LED can be increased so as to increase the amount of light itself or by increasing the amp gain after sensor output, that is, by broadening the dynamic range of the signal amplitude to the fullest extent.

M2' of FIG. 14C is the amount of LED light at M1 of FIG. 10A, or the proportion of exposure light when the amp gain after sensor output has been approximately doubled. IB2', ID2' and IE2' are intensities at points B, D and E.

L2' of FIG. 14D is a schematic representation of intensity distribution of sensor output with respect to a bar code reading in a case in which the LED light amount or the amp gain has been approximately doubled as shown in FIG. 14C. Here, RB2', RD2' and RE2' are intensities at points B, D and E, respectively. Thus, the acquired bar code pattern L2' shows few differences in output within the screen, and moreover, the signal amplitude is as broad as the dynamic range, so the number of tones is sufficient and highly accurate data can be obtained.

As described above, the present embodiment changes the brightness of the illumination light within the screen as an exposure condition and reduces uneven lighting determined by the relative positions of the light source and the subject so as to obtain a fully adequate number of tones within the screen. In the present embodiment as well, changing the brightness of the light source changes the exposure conditions within the screen, so even where outdoor light is controlling, there is conversely no over-correction as when performing electrical shading correction, and in particular, there is no need for a mechanism to detect outdoor light and switch calculations therefor.

It should be noted that the subject identification system of the embodiment described above can be adapted for use with mobile terminals such as cell phones, laptop computers, PDAs and the like.

Figure 15A:
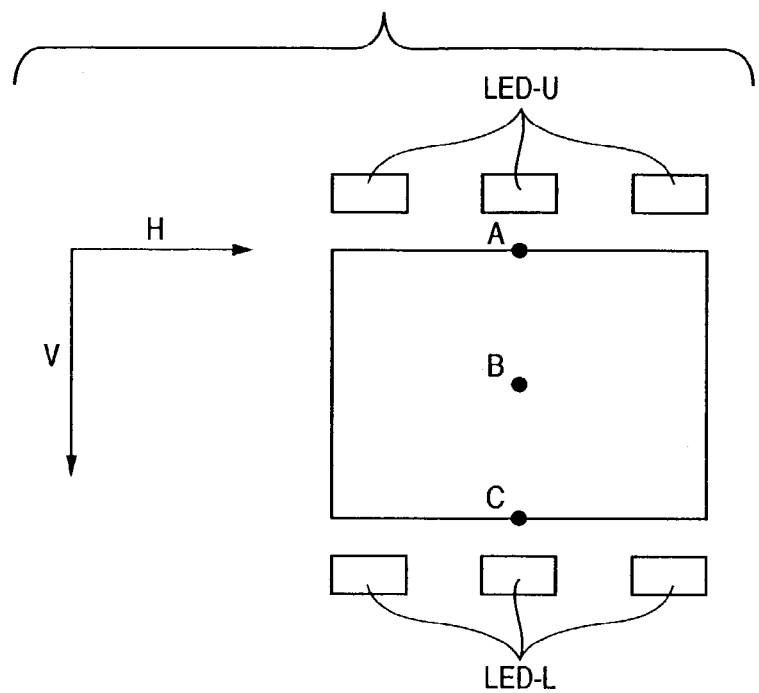
FIGS. 15A and 15B are a schematic diagram showing the spatial relation between the light source and the sensor according to a third embodiment of the present invention, and a timing chart indicating the exposure and LED triggering operations of the sensor the sensor in the third embodiment of the present invention, respectively.
Figure 15B:
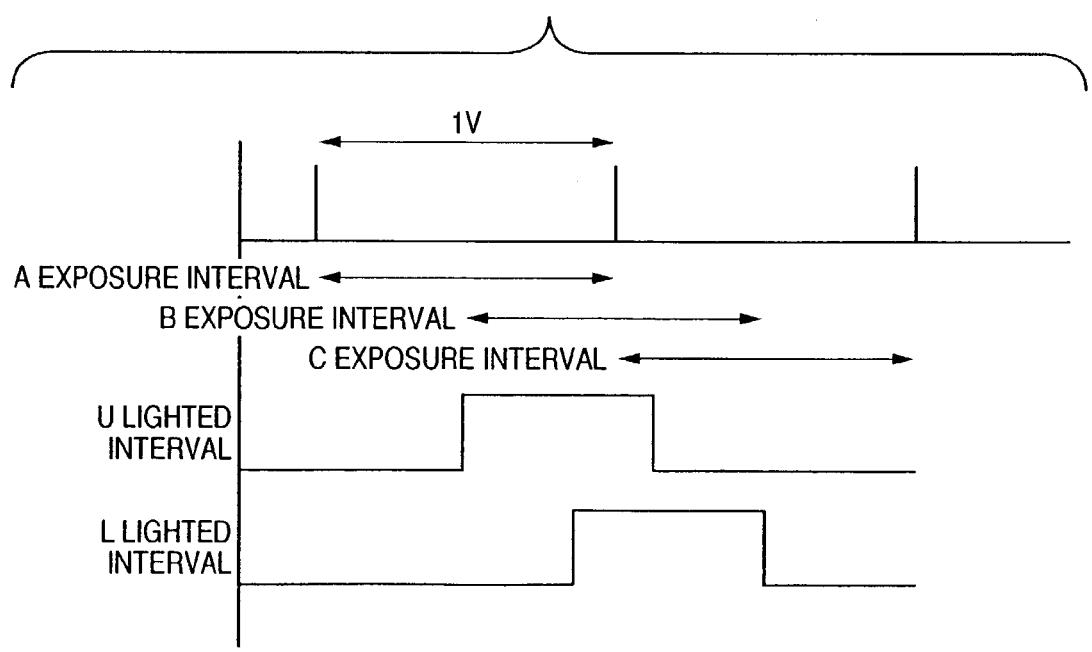

As described above, the foregoing embodiment can provide both cost and size reductions for imaging equipment as well as high-accuracy data acquisition, and as a result, can inexpensively provide subject verification systems such as fingerprint authentication equipment attached to a high-performance mobile terminal as well as subject identification systems such as handy-type bar code readers Third Embodiment FIGS. 15A and 15B are a schematic diagram showing the spatial relation between the light source and the sensor according to a third embodiment of the present invention, and a timing chart indicating the exposure and LED triggering operations of the sensor the sensor in the third embodiment of the present invention, respectively. In the diagrams, H denotes a horizontal scanning direction that is the main scanning direction of an area sensor arrayed in two dimensions, and V denotes a vertical scanning direction that is the sub-scanning direction. A, B and C are points on the sensor. LED-U and LED-L are LED arrayed on the A-side and on the C-side, respectively. 1V denotes the scanning cycle of a single screen.

In the present embodiment, the lighted interval of the LED is adjusted within the point A exposure interval, the point B exposure interval and the point C exposure interval, with exposure amount of points A and C each set at approximately half the exposure amount of point B. Exposure at point A is performed by the A-side LED-U and exposure at point C is performed by the C-side LED-L, with exposure at point B performed by both the LED-U and the LED-L.

By turning OFF the LED-L that does not contribute much to exposure at point A during the point A exposure interval, and by turning OFF the LED-U that does not contribute much to exposure at point C during the point C exposure interval, the amount of electrical power consumed by the LED can be reduced. In addition, by using both LED-U and LED-L for point B (where the amount of light is insufficient), the LED lighted interval during the exposure interval can be lengthened as compared to points A and C, thus augmenting the amount of exposure light available.

According to the present embodiment, as with the first embodiment of the present invention described above, controlling the amount of exposure light within the screen so as to offset the uneven lighting (=light shading) caused by the lighting conditions and the shape of the subject means that a fully adequate number of tones within the screen can be obtained. At this time, the present embodiment changes the interval during which light is emitted from a plurality of light sources so as to change the exposure conditions within the screen, and so there is conversely no over-correction even when outdoor light is controlling, and in particular, there is no need to detect and switch correction for outdoor lighting. In addition, the circuitry for controlling the exposure light within the screen is limited to just controlling the timing of a plurality of light sources, so there is not much of an increase in circuitry scale and virtually no increase in cost.

Fourth Embodiment

Figure 16A:
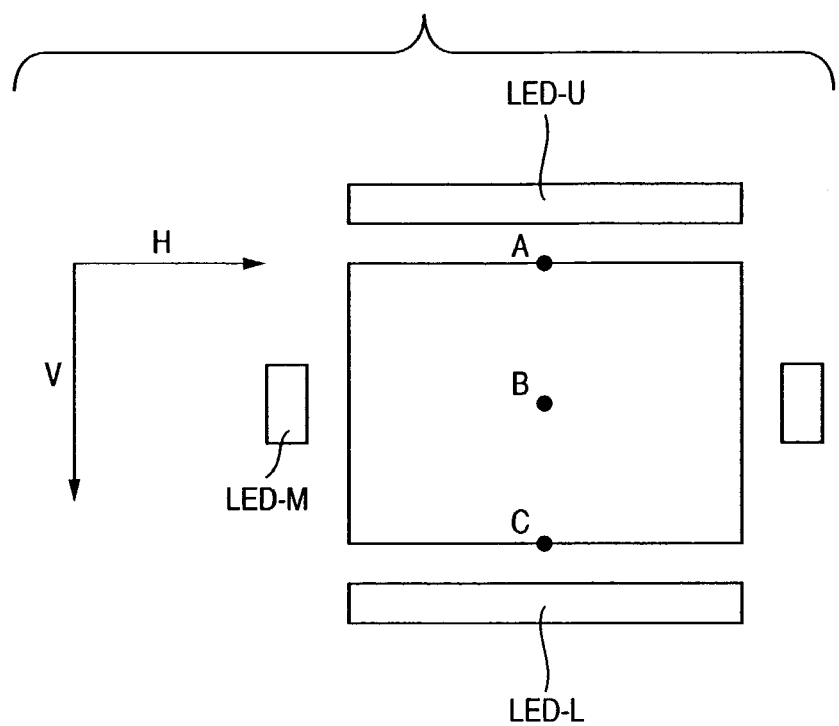
FIGS. 16A and 16B are a schematic diagram showing the spatial relation between the light source and the sensor in the third embodiment of the present invention, and a timing chart indicating the exposure and LED triggering operations of the sensor the sensor in the third embodiment of the present invention, respectively.
Figure 16B:
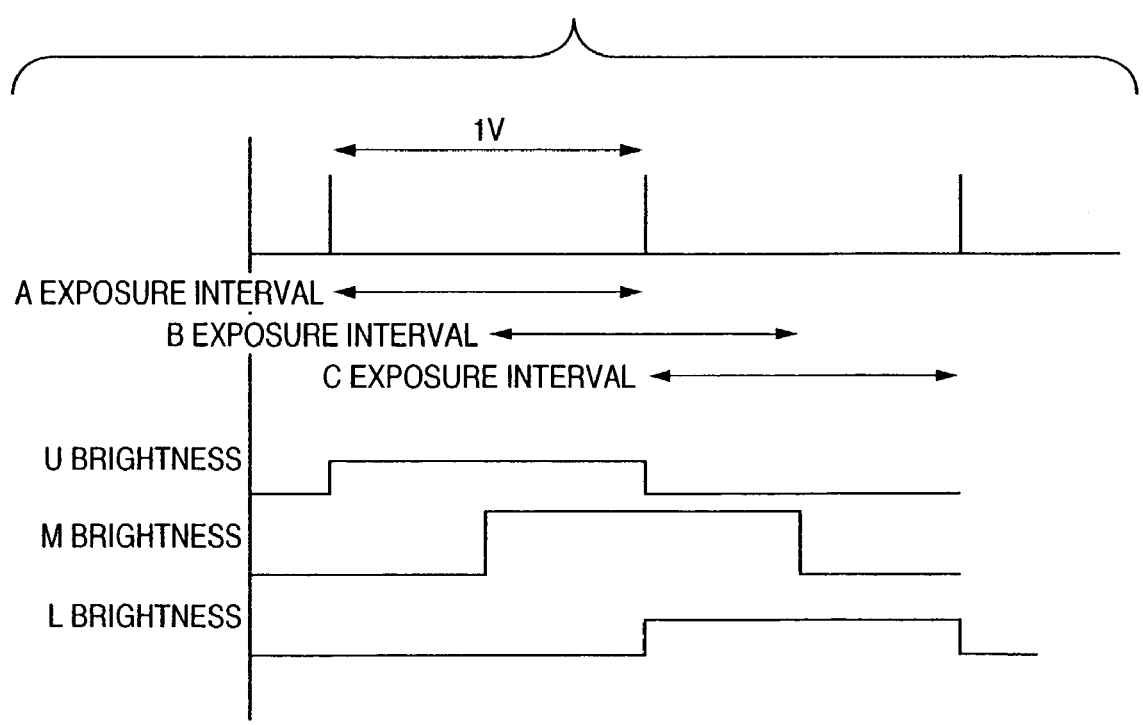

FIGS. 16A and 16B are a schematic diagram showing the spatial relation between the light source and the sensor in the third embodiment of the present invention, and a timing chart indicating the exposure and LED triggering operations of the sensor the sensor in the third embodiment of the present invention, respectively. In the diagrams, H denotes a horizontal scanning direction that is the main scanning direction of an area sensor arrayed in two dimensions, and V denotes a vertical scanning direction that is the sub-scanning direction. A, B and C are points on the sensor. LED-U, LED-L and LED-M are LED arrayed on the A-side, C-side and B-side, respectively. the brightness of LED-M is greater than the brightness of LED-U and LED-L.

In the present embodiment, exposure at point A is performed by the A-side LED-U and by LED-M, exposure at point C is performed by the C-side LED-L and by LED-M. Exposure at point B performed by the LED-U, LED-L and LED-M. By turning OFF the LED-L that does not contribute much to exposure at point A during the point A exposure interval, and by turning OFF the LED-U that does not contribute much to exposure at point C during the point C exposure interval, the amount of electrical power consumed by the LED can be reduced. In addition, by using LED-M, which is brighter than either LED-U or LED-L, for exposure at point B (where the amount of light is insufficient), the amount of exposure light available can be augmented.

According to the present embodiment, as with the first embodiment of the present invention described above, controlling the amount of exposure light within the screen so as to offset the uneven lighting (=light shading) caused by the lighting conditions and the shape of the subject means that a fully adequate number of tones within the screen can be obtained. At this time, the present embodiment changes the arrangement and brightness of the light sources so as to change the exposure conditions within the screen, and so there is conversely no over-correction even when outdoor light is controlling, and in particular, there is no need to detect and switch correction for outdoor lighting. In addition, the circuitry for controlling the exposure light within the screen is limited to just controlling the type of light source and the light source timing, so there is not much of an increase in circuitry scale and virtually no increase in cost.

The third and forth embodiments described above take the conventional arrangement, in which the whole screen is exposed with the same light source group and the same exposure interval, and divides the lighting systems so as to change the lighted interval and brightness in order to light up only those light sources nearest the subject as determined by exposure scanning of the screen. As can be appreciated by those of ordinary skill in the art, it is also possible to change the brightness of the third embodiment and the lighted interval of the fourth embodiment. By doing so, it is possible to provide an imaging apparatus that performs illumination efficiently and is energy-efficient as well.

In addition, these embodiments turn On and OFF a plurality of systems of light sources according to the distance between the light sources and the subject, so as to carry out correction of shading caused by uneven lighting without increasing either the scale of the circuitry or the cost of the apparatus. (where the amount of light may appear to be insufficient, two light source systems are driven simultaneously so as to overlap.) By so doing, the dynamic range can be increased. Moreover, these embodiments make it possible to correct only when illuminating the subject with artificial light sources, without the impact of over-correction during outdoor lighting.

As a result, the present embodiments described above are capable of providing inexpensive, compact, energy-efficient subject identification system that can be mounted in portable equipment.

Fifth Embodiment

Figure 17A:
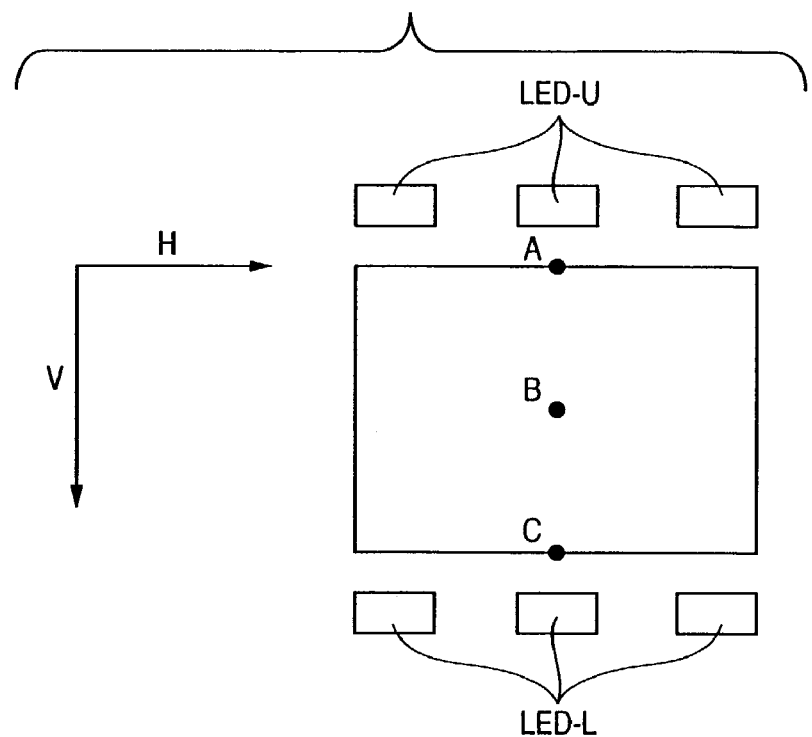
FIGS. 17A and 17B are a schematic diagram showing the spatial relation between the light source and the sensor in the third embodiment of the present invention, and a timing chart indicating the exposure and LED triggering operations of the sensor the sensor in the third embodiment of the present invention, respectively.
Figure 17B:
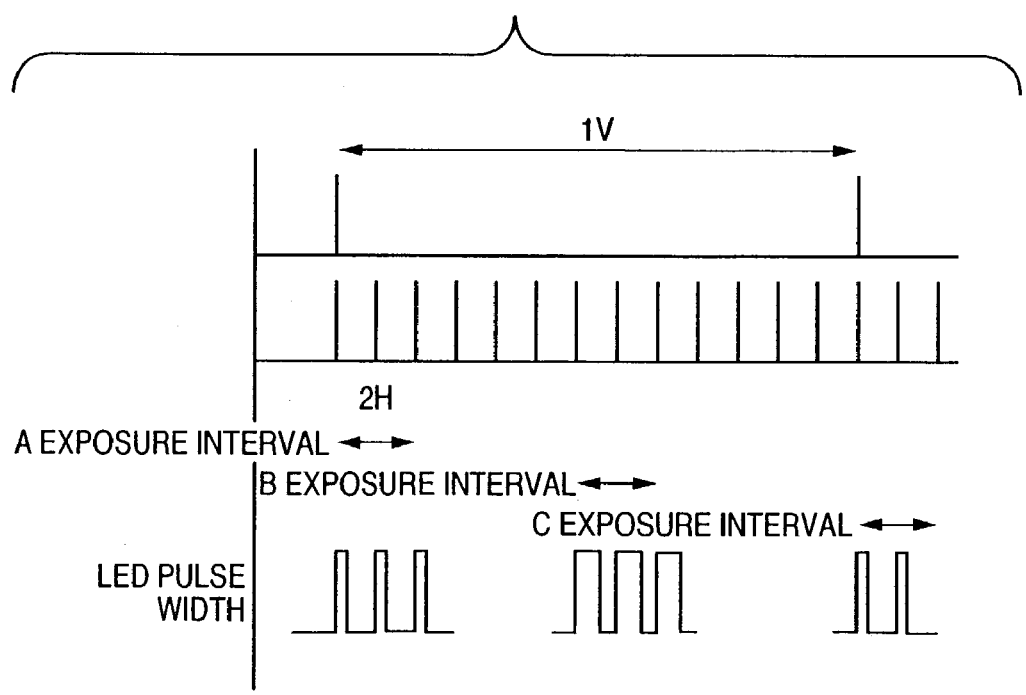

FIGS. 17A and 17B are a schematic diagram showing the spatial relation between the light source and the sensor in the third embodiment of the present invention, and a timing chart indicating the exposure and LED triggering operations of the sensor the sensor in the third embodiment of the present invention, respectively. In the diagrams, H denotes a horizontal scanning direction that is the main scanning direction of an area sensor arrayed in two dimensions, and V denotes a vertical scanning direction that is the sub-scanning direction. A, B and C are points on the sensor. LED-U and LED-L are LED arrayed on the A-side and on the C-side, respectively. It should be noted that the exposure interval at points A, B and C is 2H (that is, double the frequency (1H) of the main (horizontal) scanning).

The LED light emission frequency is set to n-times the area sensor main scanning direction scanning frequency (where n is a whole number=1, 2, 3 . . . ), and the scan of the sensor in the main scanning direction and the LED light emission are synchronized. Here, n=1, that is, the LED light emission frequency and the area sensor main scanning direction scanning frequency are the same. In such a state, the LED emitted light pulse width is changed in units of either a single main scanning interval of the sensor or a plurality of main scanning intervals of the sensor (where H is the main scanning interval). In the present embodiment, the unit is 2 main scanning intervals (that is, 2H), the exposure interval at points A and C is the emitted light pulse width (T), the exposure interval at point B being the LED (LED-U, LED-L) emitted light pulse width (3T, that is, 3 times the emitted light pulse width).

According to such a configuration, the amount of light emitted within the screen can be controlled even when exposure is performed using an electronic shutter, thus making exposure control possible. Here, the amount of exposure light at points A and C is controlled by the LED pulse width control so as to be approximately one third that at point B. In other words, at the point A exposure interval and the point C exposure interval, compared to the exposure interval at point B, the LED pulse width is approximately one third that at point B, and the amount of exposure light at points A and C is approximately one third that at point B.

According to the above-described embodiment, as with the first embodiment of the present invention described above, controlling the amount of exposure light within the screen so as to offset the uneven lighting (=light shading) caused by the lighting conditions and the shape of the subject means that a fully adequate number of tones within the screen can be obtained. The present embodiment changes the pulse width of the light source so as to change the exposure conditions within the screen, and so there is conversely no over-correction even when outdoor light is controlling, and in particular, there is no need to detect and switch correction for outdoor lighting. In addition, the circuitry for controlling the exposure light within the screen is limited to just controlling the light source timing, so there is not much of an increase in circuitry scale and virtually no increase in cost.

Sixth Embodiment

Figure 18A:
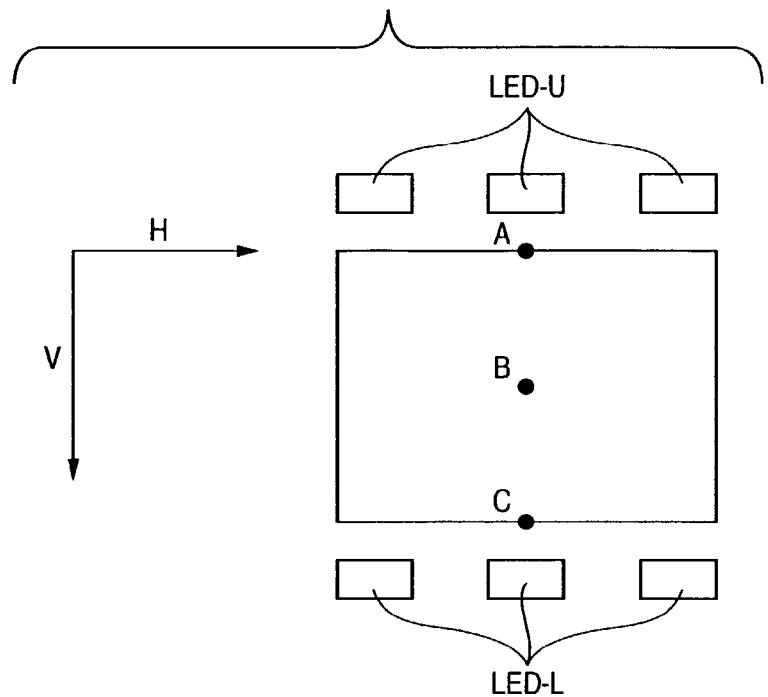
FIGS. 18A and 18B are a schematic diagram showing the spatial relation between the light source and the sensor in the third embodiment of the present invention, and a timing chart indicating the exposure and LED triggering operations of the sensor the sensor in the third embodiment of the present invention, respectively.
Figure 18B:
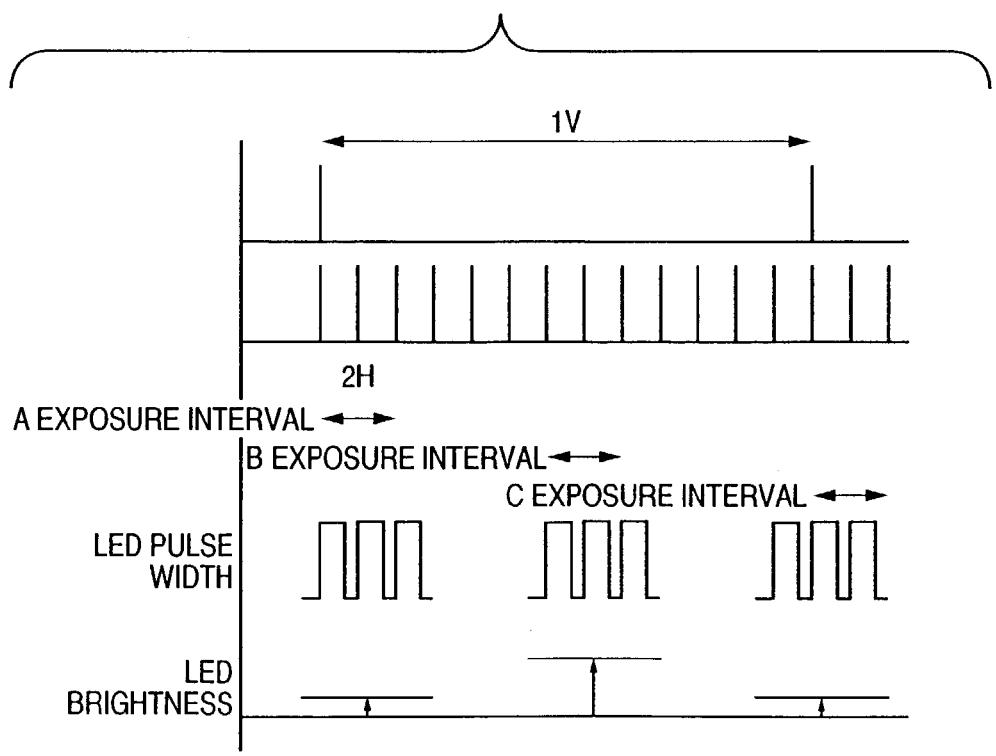

FIGS. 18A and 18B are a schematic diagram showing the spatial relation between the light source and the sensor in the third embodiment of the present invention, and a timing chart indicating the exposure and LED triggering operations of the sensor the sensor in the third embodiment of the present invention, respectively. In the diagrams, H denotes a horizontal scanning direction that is the main scanning direction of an area sensor arrayed in two dimensions, and V denotes a vertical scanning direction that is the sub-scanning direction. A, B and C are points on the sensor. LED-U and LED-L are LED arrayed on the A-side and on the C-side, respectively. It should be noted that the exposure interval at points A, B and C is 2H (that is, double the frequency (1H) of the main (horizontal) scanning).

The LED light emission frequency is set to n-times the area sensor main scanning direction scanning frequency (where n is a whole number=1, 2, 3 . . . ), and the scan of the sensor in the main scanning direction and the LED light emission are synchronized. Here, n=1, that is, the LED light emission frequency and the area sensor main scanning direction scanning frequency are the same. In such a state, the LED brightness is changed in units of either a single main scanning interval of the sensor or a plurality of main scanning intervals of the sensor (where H is the main scanning interval). In the present embodiment, the unit is 2 main scanning intervals (that is, 2H), the brightness L during exposure interval at points A and C is the emitted light pulse width (T) and the LED brightness during exposure interval at point B is 3L (that is, 3 times as bright as at points A and C).

In the present embodiment, the pulse width is provided in synchrony with the main scan, at a frequency of n-times the main scanning direction scanning frequency and the brightness is changed with respect to the sub-scanning direction, as a result of which the amount of light emitted within the screen can be controlled even when exposure is performed using an electronic shutter, thus making exposure control possible. The amount of exposure light at points A and C is controlled so as to be approximately one third that at point B. In other words, at the point A exposure interval and the point C exposure interval, compared to the exposure interval at point B, the LED pulse width is approximately one third that at point B, and the amount of exposure light at points A and C is approximately one third that at point B.

According to the above-described embodiment, as with the first embodiment of the present invention described above, controlling the amount of exposure light within the screen so as to offset the uneven lighting (=light shading) caused by the lighting conditions and the shape of the subject means that a fully adequate number of tones within the screen can be obtained. The present embodiment changes the brightness of the light source so as to change the exposure conditions within the screen, and so there is conversely no over-correction even when outdoor light is controlling, and in particular, there is no need to detect and switch correction for outdoor lighting. In addition, the circuitry for controlling the exposure light within the screen is limited to just controlling the light source timing, so there is not much of an increase in circuitry scale and virtually no increase in cost.

The fifth and sixth embodiments of the present invention described above take the conventional arrangement, in which the light source is driven ON/OFF in synchrony with the cycle of a single screen, and instead drives the light source at a frequency equal to n times the horizontal scanning frequency.

By doing so, the amount of change in the current due to the light source is reduced, thus reducing noise and, at the same time, allowing a small condenser to be used. For example, in the case of a conventional single screen scanning interval Tv, in which the LED is turned ON/OFF by current Ip at DUTY50%, the amount of charge in motion in a single ON/OFF cycle is $Q1=IpTv/2$. By contrast, with the present embodiments of the invention, in which the LED is turned ON/OFF by a current Ip at DUTY50% in synchrony with a single horizontal scanning interval Th, the amount of charge in motion during a single ON/OFF cycle is $Q2=IpTh/2$. Within a single screen scanning interval, with N horizontal scan screens, $Tv=N \times Th_o$. Since $Q=CV$, the change in electric potential $\Delta V$ of the electric power source due to the movement of electric charge is $\Delta V=\Delta Q/C$. Calculating the required capacity of the condensers when making the power fluctuation the same during a single ON/OFF cycle reveals that $\Delta V=\Delta Q1/C1=\Delta Q2/C2$, from which $C1=N \times C2$. For example, if there are 600 horizontal scan lines, then with the present invention a capacity that is 1/600 that of the conventional arrangement will suffice. In addition, if the capacities are the same and the two are compared, a power fluctuation of 1/600 is sufficient. As a result, it becomes possible to replace that which requires the conventional large-capacity condenser with a compact, low-cost item.

Moreover, whereas exposure by electronic shutter, though it allowed the exposure interval to be a multiple of the horizontal scanning interval, the conventional method of turning the LED ON/OFF involves separating within a single screen the interval during which the LED is lit from the interval during which the LED is not lit, which results in some areas not being exposed. By contrast, by driving the LED as described in the present invention, it is possible to control exposure for the entire screen.

In addition, the present invention can correct for shading caused by uneven lighting without increasing the scale of the circuitry or the cost by driving the light source at a multiple n of the horizontal scanning frequency and by changing the light emission conditions of the light source at the vertical scanning direction (that is, the sub-scanning direction). As a result, the present invention can expand the dynamic range. Moreover, the present invention makes it possible to correct only when illuminating the subject with artificial light sources, without the impact of over-correction during outdoor lighting.

By so doing, the present invention is capable of providing inexpensive, compact, energy-efficient subject identification system that can be mounted in portable equipment.

As described above, with the first through fifth embodiments of the present invention, highly accurate data can be acquired using an image input apparatus having: an LED as a light-emitting device that projects light onto a subject; a sensor such as that shown for example in FIG. 3, in which a plurality of pixels are arrayed so as to detect light from the subject; a drive circuit as a timing generator that drives the circuit; and a microprocessor as a controller that adjusts the light-emitting device so as to change the illumination lighting conditions of the light-emitting device (such as, for example, the LED lighting conditions shown in FIGS. 7, 9, 13, 15B, 16B, 17B and 18B, etc.) for a second region of the sensor (such as the center of the sensor) different from a first region of the sensor (such as the periphery of the sensor).

The present invention is not limited to the above embodiments and various changes and modifications can be made within the spirit and scope of the present invention. Therefore, to apprise the public of the scope of the present invention, the following claims are made.

What is claimed is:

1. An image input apparatus comprising:
   an irradiation device for irradiating a subject;
   a sensor provided with a plurality of picture elements (pixels) for detecting light from the subject;
   a drive circuit for driving the sensor; and
   a controller for controlling irradiation conditions of the irradiation device so as to change irradiation conditions for a first region inside the sensor and a second region inside the sensor different from the first region, wherein the drive circuit sequentially resets and scans the plurality of pixels of the sensor, and reads out and scans signals from the plurality of pixels of the sensor after commencement of the reset scanning; and the controller that controls the irradiating device so the irradiating device irradiates during the reset scanning and stops irradiating during signal read-out scanning.

2. A subject identification system comprising:

the image input apparatus according to claim 1; and an identification unit that compares a picture signal of a subject from the image input apparatus with a previously obtained picture signal of the subject.

* * * * *